US006523410B2

(12) United States Patent  
Matsubara et al.

(10) Patent No.: US 6,523,410 B2  
(45) Date of Patent: Feb. 25, 2003

(54) ANGULAR RATE SENSOR

(75) Inventors: Katsunori Matsubara, Osaka (JP); Masakazu Hatanaka, Osaka (JP); Satoshi Ouchi, Hyogo (JP); Junichi Yukawa, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/890,458

(22) PCT Filed: Dec. 14, 2000

(86) PCT No.: PCT/JP00/08862

§ 371 (c)(1),  
(2), (4) Date: Oct. 9, 2001

(87) PCT Pub. No.: WO01/44755

PCT Pub. Date: Jun. 21, 2001

(65) Prior Publication Data

US 2002/0134156 A1 Sep. 26, 2002

(30) Foreign Application Priority Data

Dec. 14, 1999 (JP) ............................................ 11-354304

(51) Int. Cl.$^7$ ................................................. G01P 9/00
(52) U.S. Cl. .................................................... 73/504.16
(58) Field of Search .......................... 73/504.16, 504.15, 73/504.12, 504.02

(56) References Cited

FOREIGN PATENT DOCUMENTS

| EP | 0 955 519 | 11/1999 |
| JP | 8-304075 | 11/1996 |
| JP | 9-273933 | 10/1997 |
| JP | 10-221087 | 8/1998 |

*Primary Examiner*—Richard A. Moller  
(74) *Attorney, Agent, or Firm*—Wenderoth, Lind & Ponack, L.L.P.

(57) ABSTRACT

An object of the present invention is to improve the efficiency of a driving operation of an angular rate sensor employing a tuning fork oscillator made of single crystalline piezoelectric material such as quartz. In order to achieve the object of the present invention, a tuning fork oscillator assembled directly has driver electrodes and detector electrodes provided on a first main surface, a second main surface, an outer surface, and an inner surface of a arm, respectively. The oscillator also has a driver electrode, a monitor electrode, and detector electrodes provided on a first main surface, a second main surface, an inner surface, and an outer surface of the other arm thereof, respectively. A driving voltage is supplied from a driving power source so that the two driver electrodes may be equal in the polarity while the polarity of the driver electrode is opposite to that of the driver electrodes.

70 Claims, 15 Drawing Sheets

ANGULAR RATE SENSOR

TECHNICAL FIELD

The present invention relates to an angular rate sensor for an attitude controlling and navigation of mobile units including air crafts, automobiles, robots, vessels, and vehicles, for a protection from wobble of a still camera or video camera hands, and for a remote controller for remote controlling.

BACKGROUND ART

A monolithic type of an angular rate sensor is known as fabricated by directly bonding two quartz counterparts as single crystalline piezoelectric materials in the direction of the crystallographic axis and the thickness which create opposite polarities of piezoelectric effect and then cutting them into a tuning-fork shape. FIG. 15 is a schematic view of the arrangement of electrodes on arms of a tuning fork oscillator in the angular rate sensor. The sensor will be described below.

As shown in FIG. 15, the tuning fork oscillator 100 has arms 100a and 100b. The tuning fork oscillator 100 also has a set of electrodes 101 to 108 provided on the arms 100a and 100b substantially throughout the whole length. Each electrode is formed by sputtering or vapor depositing a layer of Cr on a base material and then sputtering or vapor depositing a layer of Au, Ag, Al, or the like on the Cr layer. A pair of driver electrodes 101 and 102 are mounted on a first main surface and a second main surface of the arm 100a, respectively. A monitor electrode 106 is mounted on the second main surface of the arm 100a. Grounding electrodes 103, 104, and 105 are mounted on outer and inner surfaces of the arm 100a and a first main surface of the arm 100b, respectively. A pair of detector electrodes 107 and 108 are mounted on inner and outer surfaces of the arm 100b, respectively.

For a piezoelectric oscillation along the main surfaces of the tuning fork oscillator 100 at a resonance frequency, the pair of the driver electrodes 101 and 102 mounted on the arm 100a are connected to an oscillator 109 and electrically driven by the oscillator 109. The amplitude of the oscillation on the tuning fork oscillator 100 developed by the oscillator circuit 109 is measured by the monitor electrode 106 mounted on the second main surface of the arm 100b. An angular rate input about the axis of the tuning fork oscillator 100 generates a Coriolis force in a direction vertical to the main surface of the arm 100b. The force develops a stress on the arm 100b, and then the stress is detected by the detector electrodes 107 and 108 piezoelectrically.

A charge generated on the monitor electrode 106 is amplified by an external circuit and transferred to an automatic gain control (AGC) circuit. Then, it is compared with a reference level signal predetermined by the AGC circuit. The circuit controls the oscillator 109 in order to maintain a constant amplitude of the oscillation of the tuning fork oscillator 100. A signal from the detector electrodes 107 and 108 is amplified by an external circuit. The signal is synchronously-detected with the oscillation of the tuning fork detected by the monitor electrode 106, so that a signal with the Coriolis force modulated by the tuning fork oscillator 100 may be demodulated. Then, the signal has an undesired frequency component cut off by a low pass filter (LPF), and is output as a sensor output.

The conventional angular rate sensor having the foregoing arrangement has the paired driver electrodes provided on the main surfaces of one of the arms. Thus, this makes the driving operation of the tuning fork oscillator electrically driven with a constant voltage be hardly improved.

SUMMARY OF THE INVENTION

The present invention is developed for solving the above drawback and the object is to provide an angular rate sensor which is improved in the efficiency of the driving operation.

In order to achieve the object of the present invention, an angular rate sensor includes a tuning fork oscillator having a first oscillator member of a single crystalline piezoelectric material composed of at least two arms and a base joining the two arms and a second oscillator member of the single crystalline piezoelectric material having a substantially identical shape to the first oscillator member. The two oscillator members are bonded directly to each other in the direction of the crystallographic axis and the thickness so that opposite polarities of a piezoelectric effect may be developed along the widthwise direction of the oscillator members. The tuning fork oscillator thus includes at least two arms and a base. The sensor further includes: first, second, third, and fourth electrodes provided on a first main surface, a second main surface, an outer surface, and an inner surface of one of the two arms of the tuning fork oscillator, respectively; a fifth electrode provided on either a first main surface or a second main surface of the other arm of the tuning fork oscillator; and sixth and seventh electrodes provided on an inner surface and an outer surface of the other arm of the tuning fork oscillator, respectively.

When the fifth electrode is provided on the first main surface, a driving voltage is applied to the second and fifth electrodes at the same polarity, and applied to the first electrode at the reverse polarity against the second and fifth electrodes.

When the fifth electrode is provided on the second main surface, a driving voltage is applied to the second and fifth electrodes at the opposite polarity to each other, and applied to the first electrode at the same polarity as the fifth electrode.

The angular rate sensor has the efficiency of a driving operation improved.

BEST MODES FOR EMBODYING THE INVENTION

Embodiment 1

Figure 1:
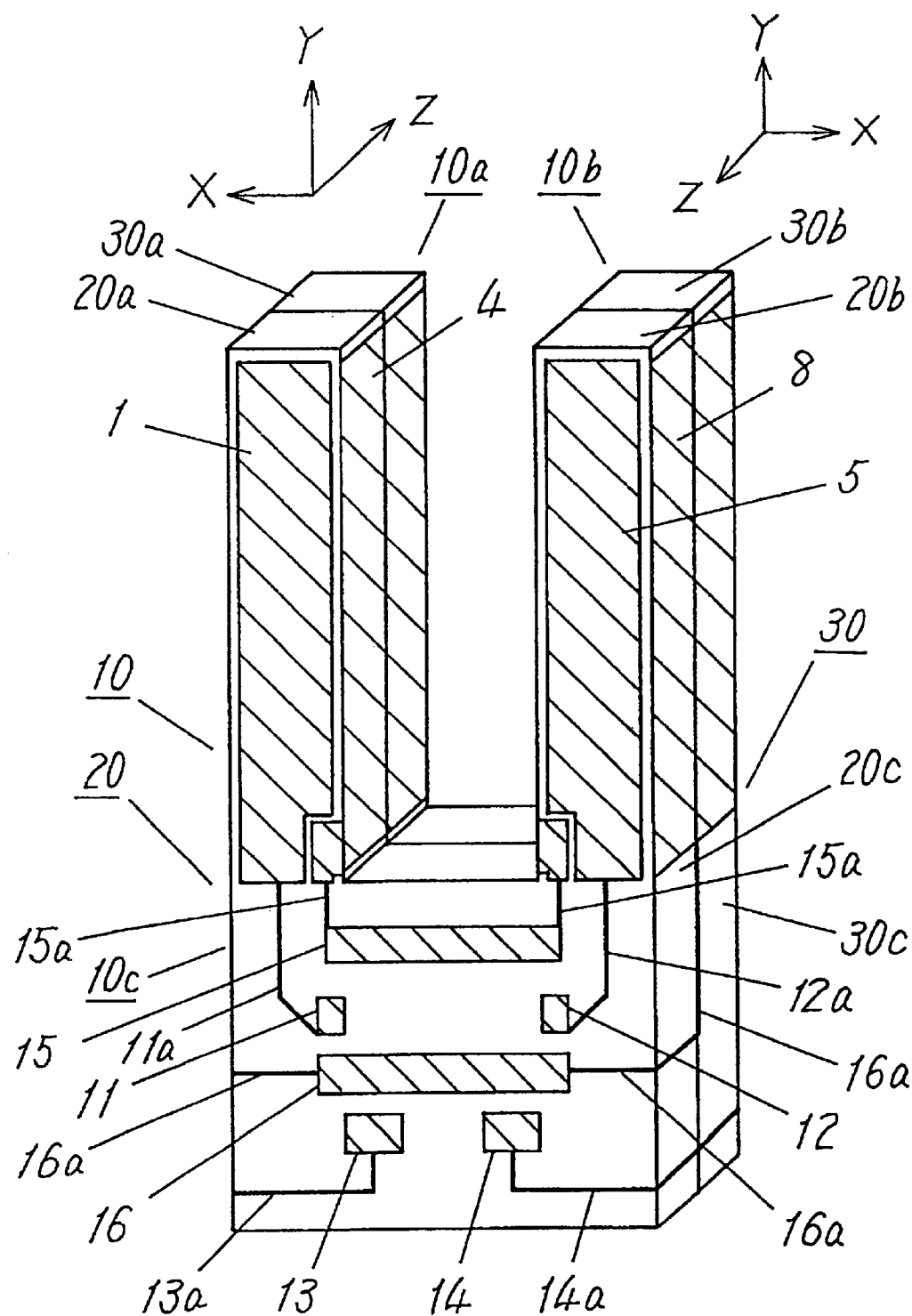
FIG. 1 is a perspective view of a tuning fork oscillator, seen from a first main surface of an angular rate sensor according to Embodiment 1 of the present invention.
Figure 2:
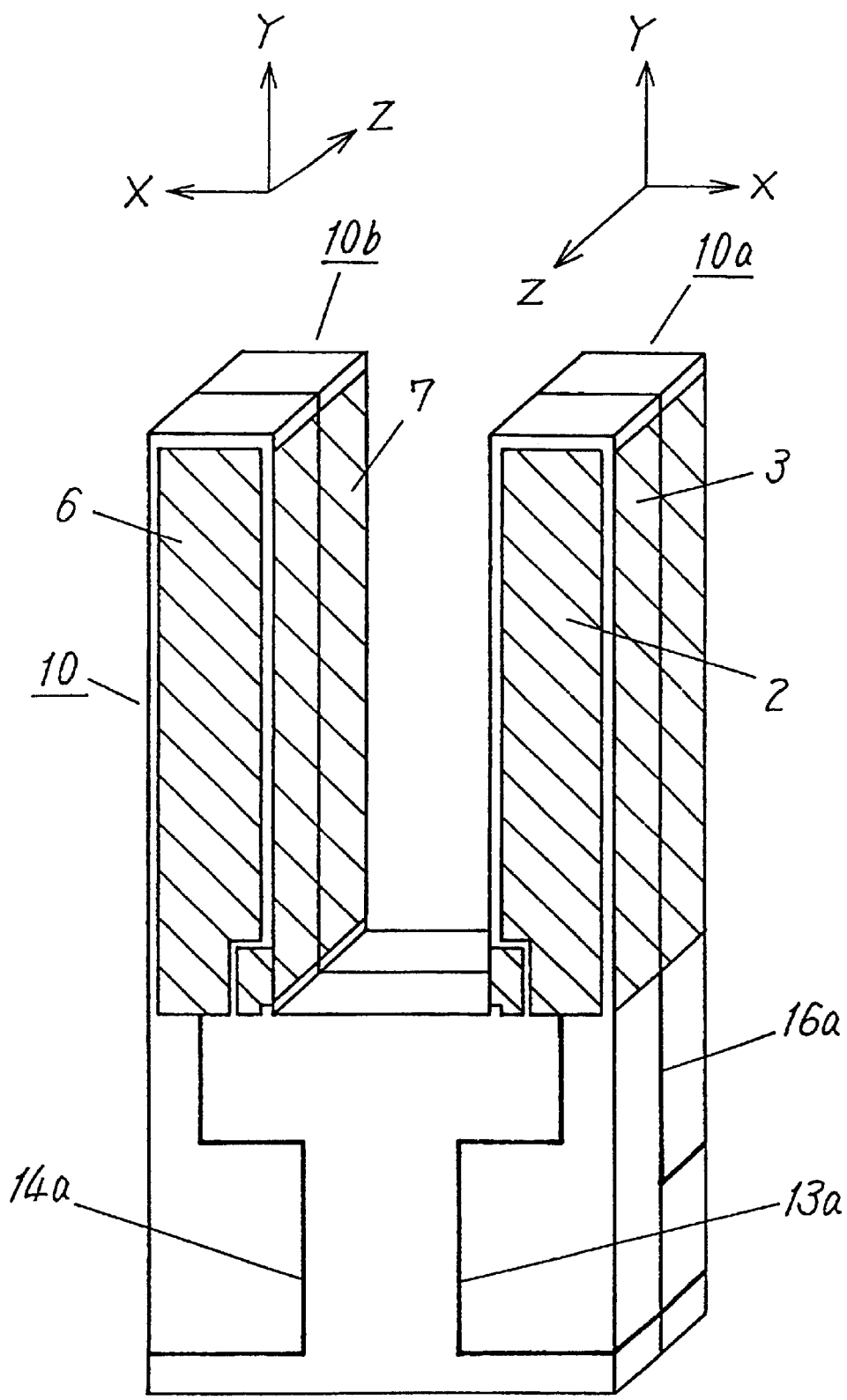
FIG. 2 is a perspective view of the tuning fork oscillator seen from a second main surface.
Figure 3:
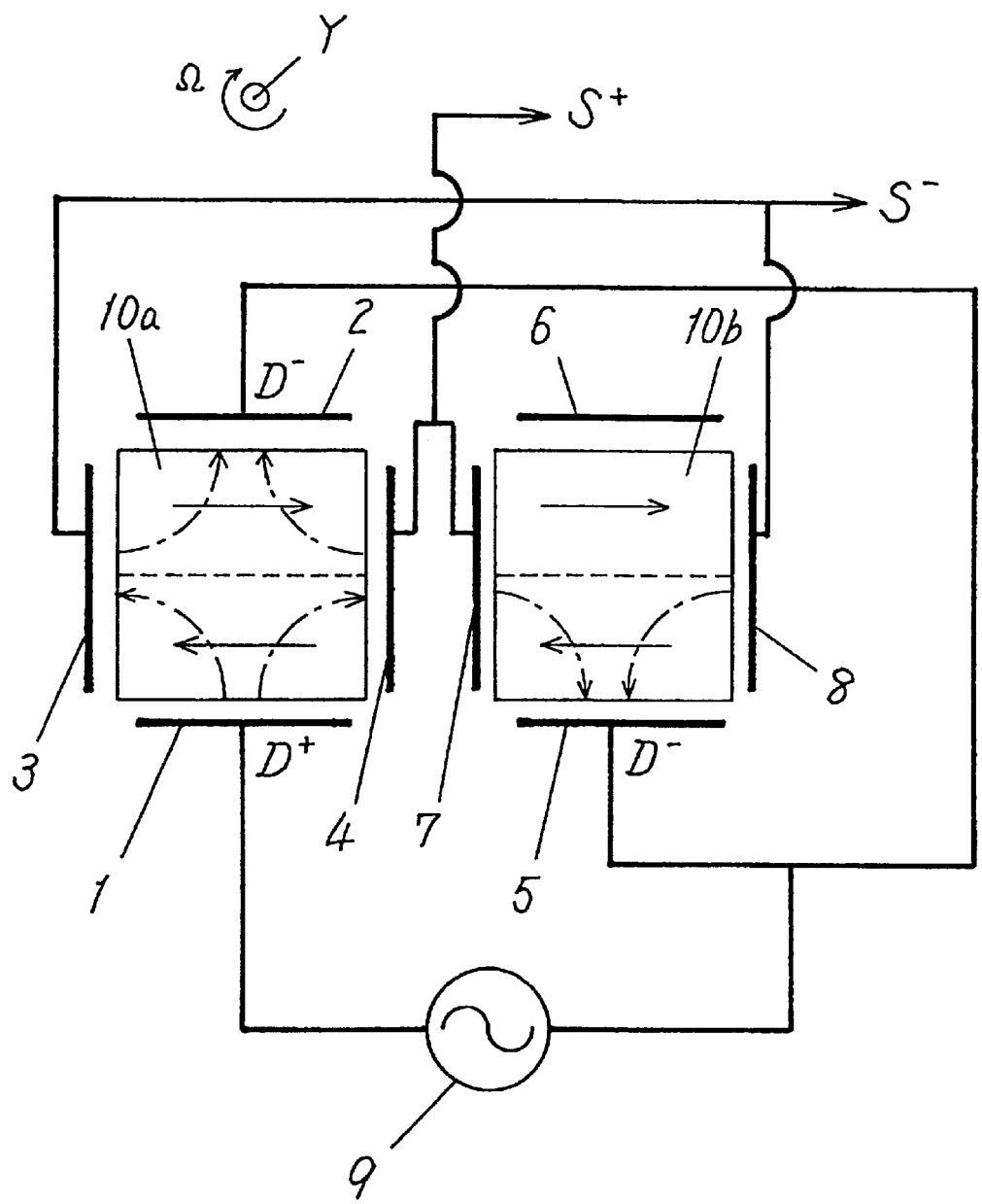
FIG. 3 is a schematic view illustrating the positional arrangement of electrodes on arms of the angular rate sensor.
Figure 4:
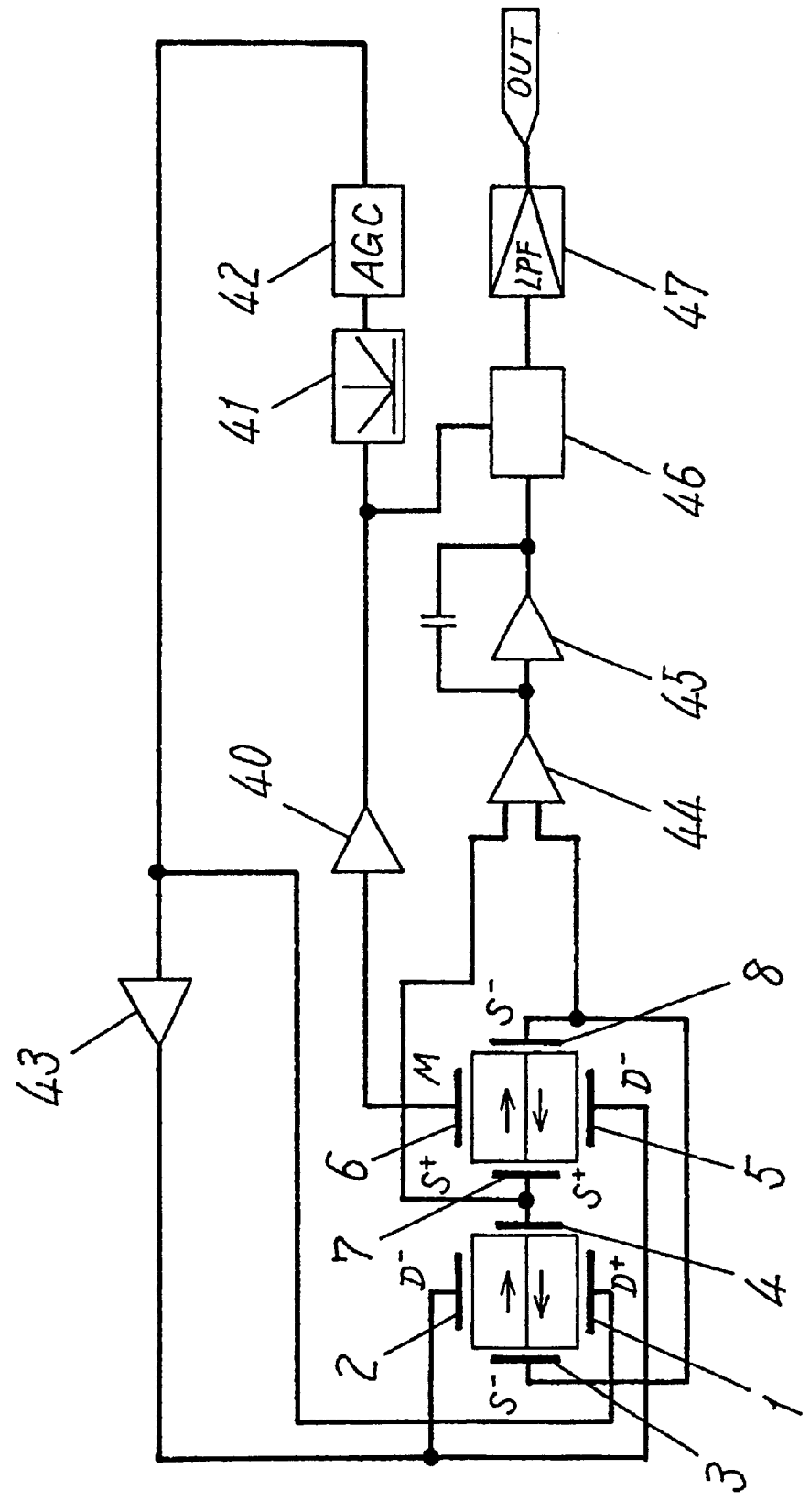
FIG. 4 is a block diagram of an electric circuit of the angular rate sensor.

FIG. 1 is a perspective view of a tuning fork oscillator, seen from the first main surface of an angular rate sensor according to Embodiment 1 of the present invention. FIG. 2 is a perspective view of the tuning fork oscillator seen from a second main surface. FIG. 3 is a schematic view illustrating the positional arrangement of electrodes on arms in the angular rate sensor. FIG. 4 is a block diagram of an electric circuit of the angular rate sensor. As shown in FIGS. 1 and 2, reference numerals 20a and 20b denote arms, which are oscillating portions, joined to each other at a base 20c, a fixing portion, thus forming an oscillator member 20. Similarly, reference numerals 30a and 30b denote arms, oscillating portions, joined to each at a base 30c, a fixing portion, thus forming an oscillator member 30. The oscillator members 20 and 30 are made of single crystalline piezoelectric material and bonded directly to each other to have a bimorph structure thus forming a tuning fork oscillator 10. The tuning fork oscillator 10 thus includes arms 10a and 10b and a base 10c. For the direct bonding, elements to be bonded have the surfaces smoothed, hydrophilized, absorbed with hydrides, joined to each other, and heated up for removing the hydrides and hydrogen from the interface. As a result, the elements are bonded like a single structure.

The oscillator member 20 has a crystallographic axis in the leftward direction on the figure. The oscillator member 30 has a crystallographic axis in the rightward direction on the figure. The oscillator members 20 and 30 are bonded to each other so that the crystallographic axes (along the x-axis) for generating piezoelectric forces extend in opposite directions against each other.

On the tuning fork oscillator 10, reference numerals 1 through 8 denote electrodes. Denoted by numerals 1, 2, and 5 are driver electrodes mounted on the first and second main surfaces of the arm 10a and the first main surfaces of the arm 10b, respectively. The driver electrodes 1, 2, and 5 extend almost throughout the whole length of the arms 10a and 10b. They are provided by sputtering or vapor depositing a layer of Cr on a base material and then sputtering or vapor depositing a layer of Au, Ag, or Al on the layer of Cr. Electrode pads and lead-out portions of the electrodes are provided on the base 10c of the tuning fork oscillator 10. The lead-out portions of the electrodes on the base 10c of the tuning fork oscillator 10 is finer than the electrodes on the arms 10a and 10b of the tuning fork oscillator 10, thus they can significantly be spaced from each other. This allows the coupling capacitance between the electrodes to be minimized.

In Embodiment 1, reference numeral 6 denotes a monitor electrode 6 on the second main surface of the arm 10b. And reference numerals 3 and 8 denote detector electrodes on outer surfaces of the arms 10a and 10b, respectively, which are connected to each other. Reference numerals 4 and 7 denote detector electrodes on inner surfaces of the arms 10a and 10b, respectively, which are connected to each other. The detector electrodes 4, 7 are linked to the electrode pad 15 through a lead-out portion 15a patterned on the first main surface of the base 10c. The detector electrodes 3, 8 are linked to the electrode pad 16 through a lead-out portion 16a patterned on the first main surface of the base 10c. The driver electrodes 1, 2, and 5 are linked to electrode pads 11, 12, and 13 and lead-out portions 11a, 12a, and 13a, respectively, patterned on the first main surface of the base 10c. The electrode pad 14 and lead-out portion 14a of the monitor electrode 6 are patterned on the first main surface of the base 10c. The lead-out portions 13a, 14a, and 16a extend from the driver electrode 2 on the second main surface to the electrode pad 13, from the monitor electrode 6 on the second main surface to the electrode pad 14, and from the detector electrodes 3 and 8 on the outer surfaces to the electrode pad 16, respectively. The lead-out portions are patterned on the second main surface and the outer surfaces of the base 10c then reach the first main surface. The positional arrangement of the electrodes in Embodiment 1 is illustrated in FIG. 3.

An operation of the angular rate sensor of Embodiment 1 will be described. Between the driver electrode 1 and the driver electrodes 2, 5, two alternating currents having a phase difference of 180 degrees from each other are supplied by a drive source 9. The arms 10a and 10b oscillate in leftward and rightward directions (along the main surfaces) in FIG. 3, respectively. In FIG. 3, the arrows denoted by solid line represent the crystallographic axis of quartz (electric axis). The arrows denoted the one-dot chain line represent the direction of an electric field.

Between the driver electrodes 1, 2, and 5, the alternating current signal is supplied from the drive source 9. The driver electrode 1 is loaded with a positive electric field, and the electrodes 2, 5 are loaded with a negative electric field at a certain time. Accordingly, in the left half from the widthwise center of the arm 10a, the electric field is applied in the same direction as the electric axis or polarizing direction, and thus, the left half of the arm 10a is expanded. On the other hand, in the right half of the arm 10a, the electric field is applied in a direction opposite to the electric axis or polarizing direction, hence being contracted. As a result, the arm 10a bows toward the inside (the right side) in FIG. 3. Then, when the alternating current from the drive source 9 has the polarity inverted, the arm 10a bows toward the outside (the left side) in FIG. 3. Repeating the operation makes the arm 10a perform a resonant oscillation.

In the left half from the widthwise center of the arm 10b, oppositely to the arm 10a, the electric field is applied in a direction opposite to the electric axis or polarizing direction, and thus, the left half of the arm 10b is compressed. In the right half of the arm 10b, the electric field is applied in the same direction as the electric axis or polarizing direction, thus being expanded. As a result, the arm 10b is bows toward the inside (the left side) in FIG. 3. Then, when the alternating current from the drive source 9 is inverted, the arm 10b bows toward the outside (the right side) in FIG. 3. Repeating the operation makes the arm 10b perform a resonant oscillation.

During the resonant oscillation, when an angular rate Ω is applied about the Y axis, the arms 10a and 10b develop a force along the Z-axis vertical to the oscillating direction along the X axis due to a Coriolis effect and thus deflects in a direction of thickness. According to the degree of deflection, a charge is sensed signal by the detector electrodes 3, 4, 7, and 8 as an angular rate. The charge is then output from common ports S+, S−. To explain it in more detail, for example, an angular rate produces a Coriolis effect which deflects the arm 10*a* toward the upper side of FIG. 3 and the arm 10*b* toward the lower side. As the lower half of the arm 10*a* is expanded, a charge is generated in the same direction as of the electric axis or polarizing direction. On the other hand, as the upper half of the arm 10*a* is compressed, a charge is generated in a direction opposite to the electric axis or polarizing direction. At this moment, oppositely to the arm 10*a*, the lower half of the arm 10*b* is compressed, and a charge is generated in a direction opposite to the electric axis or polarizing direction, and the upper half of the arm 10*b* is expanded, and a charge is generated in the same direction as the electric axis or polorizing direction. As a result, in the common port S+, a positive charge is generated, and in the common port S−, a negative charge is generated. The angular rate is detected from the charges. Then, the Coriolis effect deflects the arm 10*a* toward the lower side and the arm 10*b* toward the upper side in FIG. 3. As the polarity of each charge generated on the arms is inverted, i.e., a negative charge is generated the common port S+, and a positive charge is generated in the other common port S−, the angular rate is detected from the charges.

FIG. 4 is a block diagram showing an electric circuit of the angular sensor. A driver circuit will be explained at first. A driver circuit includes a current amplifier 40, a comparator 41, an AGC circuit 42, and an inverter 43 assembled to form a self-excited oscillator. The monitor electrode 6 of the tuning fork oscillator 10 develops a charge corresponding to the amplitude of an oscillation. The charge is received by the current amplifier circuit 40 and compared by the comparator circuit 41 with a predetermined reference level for maintaining a constant amplitude. For example, when the amplitude of the charge is greater than the reference level, the AGC circuit 42 applies an appropriate level of sine-wave signal to the driver electrodes 2, 5 via the driver electrode 1 and the inverter 43 for attenuating the amplitude. When the charge is smaller than the reference level, the AGC circuit 42 applies a sine-wave signal to the driver electrodes 2, 5 via the driver electrode 1 and the inverter circuit 43, so that the amplitude may increases to a desired level. By repeating this action, a constant amplitude of the output of the tuning fork oscillator 10 can be maintained.

In a detector circuit, the charges having different polarities and being in proportion with the angular rate is generated by the Coriolis effect on the detector electrodes 3, 4, 7, and 8. The charges are received by a differential amplifier 44, phase-advanced in 90 degrees by a phase shifter 45, and synchronously-detected by a synchronous detector 46 to which an output of the current amplifier 40 in the driver circuit is supplied. As a result, only an angular rate signal is extracted. At this moment, in the detector circuit, a signal component (an undesired signal component) is generated due to the oscillation at each detector electrodes 3, 4, 7, and 8. At the detector electrodes 3, 4 disposed symmetrically about the driver electrodes 1, 2, undesired signal components having the same amplitudes and the phases inverted to each other are generated but canceled in the detector electrodes 3, 4. At the detector electrodes 7, 8 disposed symmetrically about the driver electrode 5, undesired signal components having the same amplitudes and phases are generated but canceled in the differential amplifier 44 receiving the components. The synchronously detected output of the detector 46 is transferred to an LPF 47 where it is DC-converted, and is detected as the angular rate signal as the DC component.

According to Embodiment 1, the electrodes for applying a driving voltage is more than that of the conventional arrangement, and the efficiency of the driving operation increases to 1.5 times.

The driver electrode 5 and monitor electrode 6 are mounted on the first main surface and the second main surface of the arm 10*b*, respectively, in the embodiment. They may be switched in the location, and a signal supplied to the newly-disposed driver electrode may accordingly be inverted.

In the embodiment, the detector electrodes 3 and 4 are mounted on the outer and inner surfaces of the arm 10*a*, respectively, however they may be grounding electrodes.

In the embodiment 1, to detect the angular rate is described. A angular rate applied along the Z-axis of the arms 10*a*, 10*b* has the influence reduced or eliminated by the detector electrodes 3, 4, 7, and 8.

Embodiment 2

Figure 5:
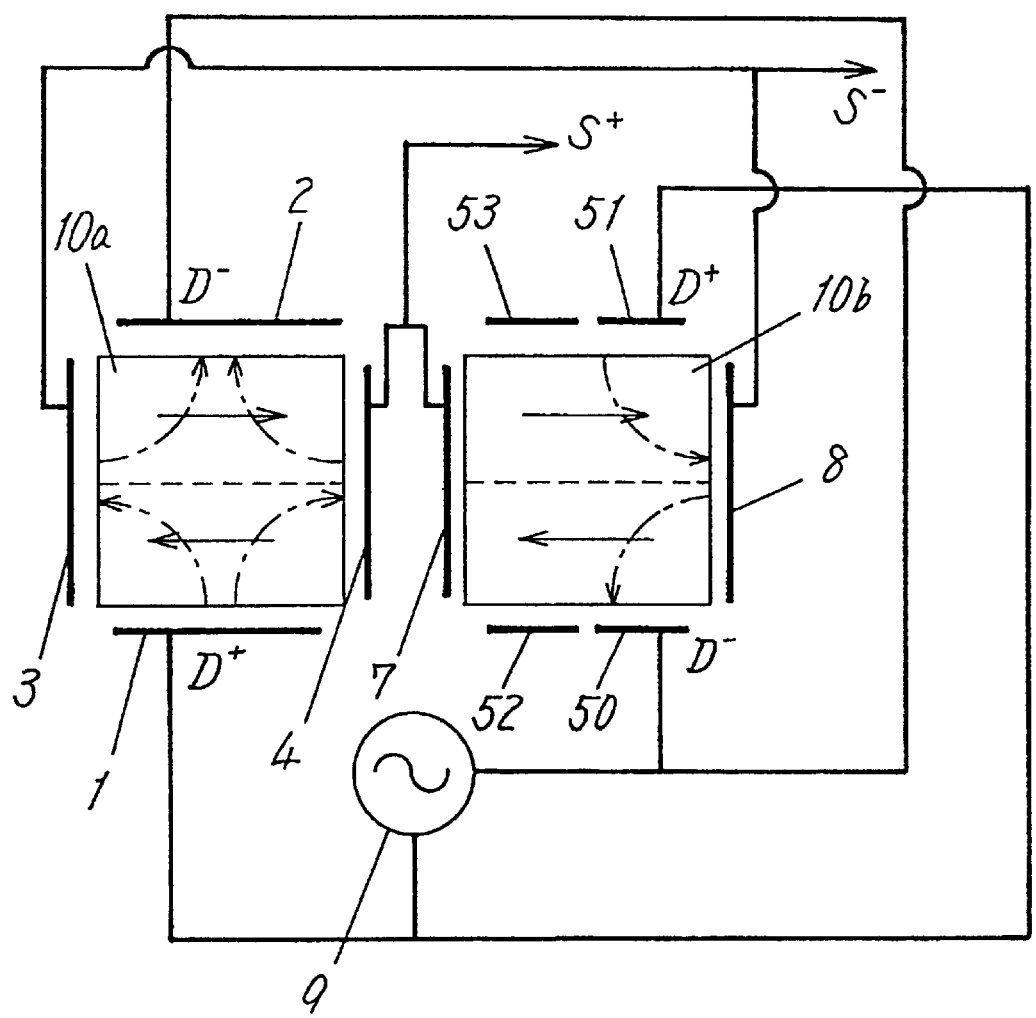
FIG. 5 is a schematic view of the positional arrangement of electrodes on arms in an angular rate sensor according to Embodiment 2 of the present invention.

FIG. 5 is a schematic view of the arrangement of electrodes on arms of an angular rate sensor according to Embodiment 2 of the present invention. In FIG. 5, like components are denoted by like numerals as those illustrated in FIGS. 1, 2, 3, and 4 and will be described in no more detail but different components. In FIG. 5, reference numeral 50 denotes a driver electrode disposed on an outer portion of the first main surface of the arm 10*b*. Reference numeral 51 denotes a driver electrode disposed on an outer portion of the second main surface of the arm 10*b*. Reference numeral 52 denotes a monitor electrode disposed on an inner portion of the first main surface of the arm 1*b*. Reference numeral 53 denotes a monitor electrode disposed on an inner portion of the second main surface of the arm 10*b*.

An operation of the angular rate sensor of Embodiment 2 will be explained. To the driver electrodes 1, 51 and the driver electrodes 2,50, two different alternating currents having different phases in 180 degrees from each other are supplied from the driving source 9, respectively, hence producing a certain tuning fork oscillation.

According to Embodiment 2, the electrodes for applying a driving voltage is more than that of the conventional sensor, and the efficiency of the driving operation increases to 1.7 times.

In Embodiment 2, a coupling capacitance component contained in an undesired signal component in the driving signal received by the detector electrodes is eliminated.

The driver electrode 51 and monitor electrode 53 are mounted on the outer and inner portions of the second main surface of the arm 10*b*, respectively, in Embodiment 2. The locations of them may be switched over with equal effects.

The monitor electrodes 52, 53 are mounted on the outer portion of the first main surface and the inner surface of the second main surface of the arm 10*b*, respectively, in Embodiment 2. Each of them may be a grounding electrode.

Embodiment 3

Figure 6:
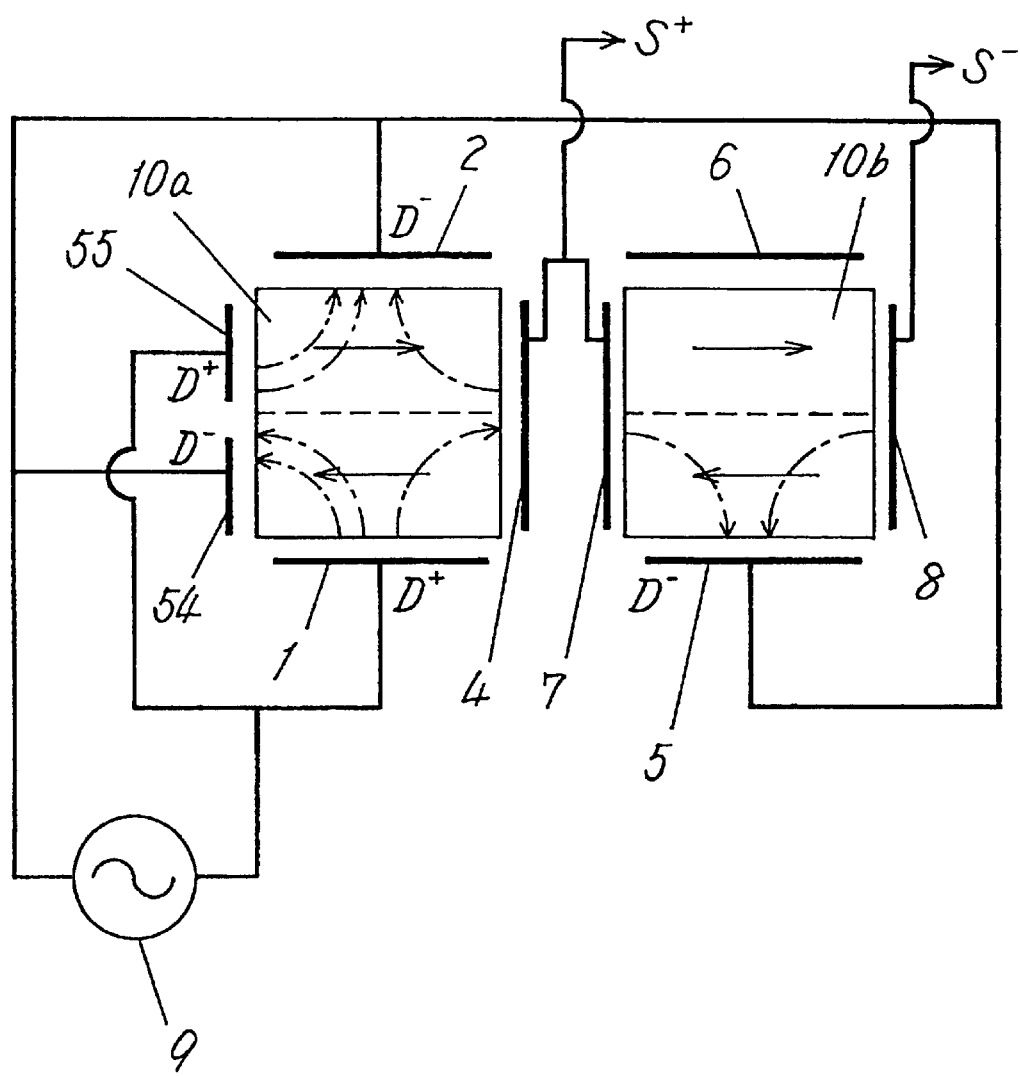
FIG. 6 is a schematic view of the positional arrangement of electrodes on arms in an angular rate sensor according to Embodiment 3 of the present invention.

FIG. 6 is a schematic view of the arrangement of electrodes on arms of an angular rate sensor according to Embodiment 3 of the present invention. In FIG. 6, like components are denoted by like numerals as those illustrated in FIGS. 1, 2, 3, and 4 and will be described in no more detail but different components. In FIG. 6, reference numeral 54 denotes a driver electrode provided on a portion of the outer surface closer to the first main surface of the arm 10*a*. Reference numeral 55 denotes a driver electrode provided on a portion of the outer surface closer to the second main surface of the arm 10a.

An operation of the angular rate sensor of Embodiment 3 will be explained. To the driver electrodes 1, 55 and driver electrodes 2, 5, and 54, alternating currents having a different phase in 180 degrees from each other are applied from the driving source 9, respectively, hence producing a tuning fork oscillation.

According to Embodiment 3, the electrodes for applying a driving voltage is more than that of the conventional sensor, and the intensity of electric field applied to a region of the arm 10a close to the outer surface is higher. Accordingly, the efficiency of the driving operation increases to 2.5 times.

In Embodiment 3, a coupling capacitance component contained in an undesired signal component in the driving signal received by the detector electrodes is eliminated.

The driver electrode 5 and monitor electrode 6 are mounted on the first main surface and the second main surface of the arm 10b, respectively, in Embodiment 2. They may be switched over in the location, and the alternating currents applied to the respective driver electrodes may accordingly be opposite in the polarity to those of this arrangement.

The monitor electrodes 54, 55 are mounted on the outer surface of the arm 10a in Embodiment 3, and the detector electrode 4 is mounted on the inner surface of the arm. The electrodes 54, 55 may be switched over with the detector electrode 4 in the location.

The detector electrode 4 is mounted on the inner surface of the arm 10a in the embodiment, and however may be a grounding electrode.

The driver electrode 5 is mounted on the first main surface of the arm 10b in the embodiment, and however may be a grounding electrode. This increases the efficiency of the driving operation to 2.0 times greater than that of the conventional sensor. Simultaneously, as the driver electrodes 1, 2 are equally spaced from the corresponding detector electrodes 7, 8, undesired coupling capacitance components generated on the detector electrode 7, 8 are offset to each other, hence an influence of a noise is eliminated.

Embodiment 4

Figure 7:
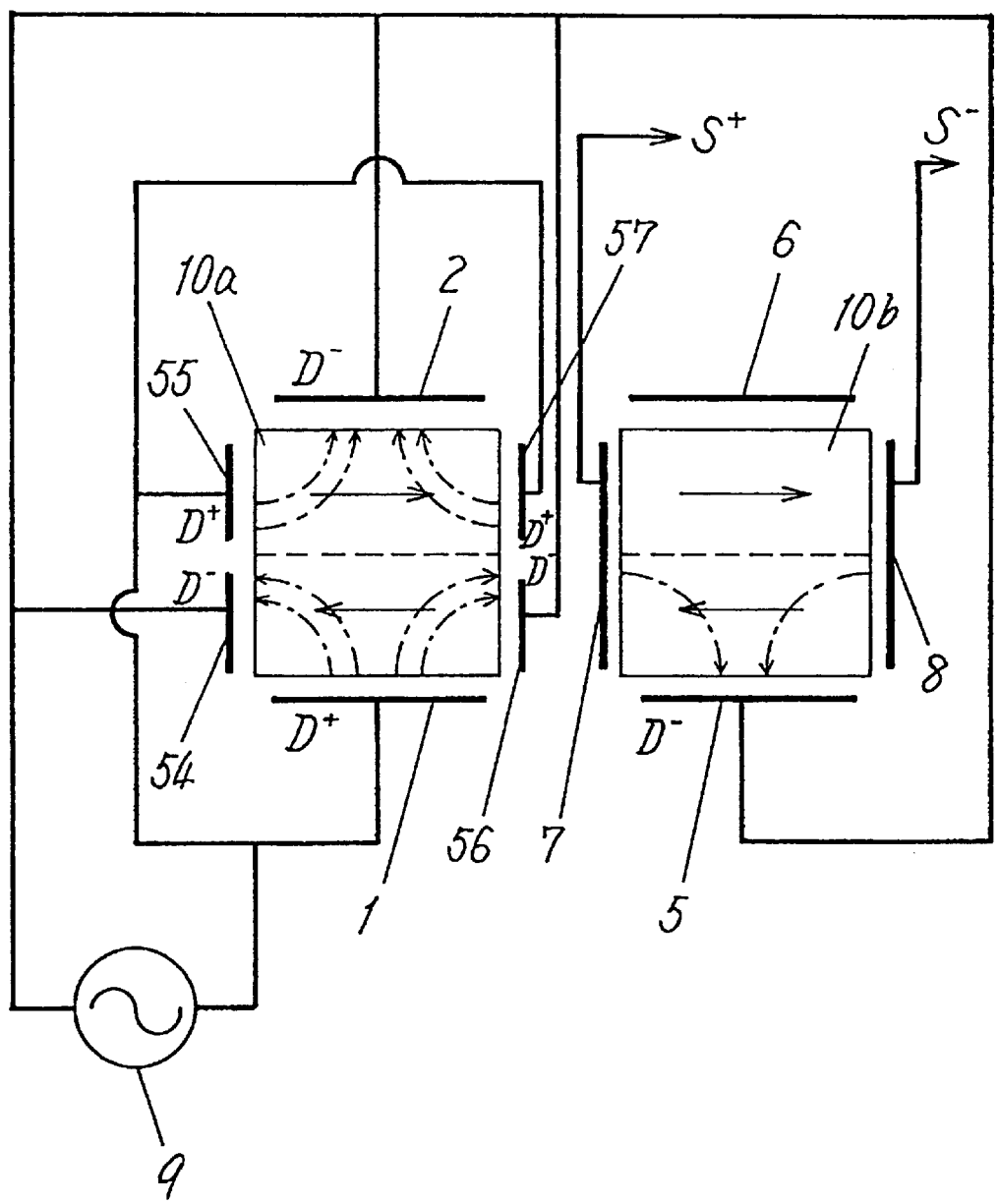
FIG. 7 is a schematic view of the positional arrangement of electrodes on arms in an angular rate sensor according to Embodiment 4 of the present invention.

FIG. 7 is a schematic view of the arrangement of electrodes on arms of an angular rate sensor according to Embodiment 4 of the present invention. In FIG. 7, like components are denoted by like numerals as those illustrated in FIG. 6 and will be described in no more detail but different components. In FIG. 7, reference numeral 56 denotes a driver electrode provided on a portion of the inner surface closer to the first main surface of the arm 10a. Reference numeral 57 denotes a driver electrode provided on a portion of the inner surface closer to the second main surface of the arm 10a.

An operation of the angular rate sensor of Embodiment 4 will be explained. To the driver electrodes 1, 55, and 57 and driver electrodes 2, 5, 54, and 56, alternating currents having different phases of 180 degrees from each other are supplied, respectively, hence producing a tuning fork oscillation.

According to Embodiment 4, the number of electrodes for applying a driving voltage is more than that of the conventional sensor, and the intensity of electric field applied to the arm 10a is higher than the conventional sensor. Accordingly, the efficiency of the driving operation increases to 3.2 times greater.

In Embodiment 4, a coupling capacitance component contained in an undesired signal component in the driving signal received by the detector electrodes is canceled.

The driver electrode 5 and monitor electrode 6 are mounted on the first and second main surfaces of the arm 10b, respectively, in the embodiment. They may be switched over in the location, and the alternating currents applied to the respective driver electrodes may accordingly be opposite in the polarity to those of this arrangement.

The driver electrode 5 mounted on the first main surface of the arm 10b may be a grounding electrode. This increases the efficiency of the driving operation to 2.7 times greater than that of the conventional sensor. Simultaneously, as the driver electrodes 1, 2 are equally spaced from the corresponding detector electrodes 7, 8, undesired coupling capacitance components developed on the detector electrode 7, 8 is offset to each other, hence an influence of a noise is eliminated.

Embodiment 5

Figure 8:
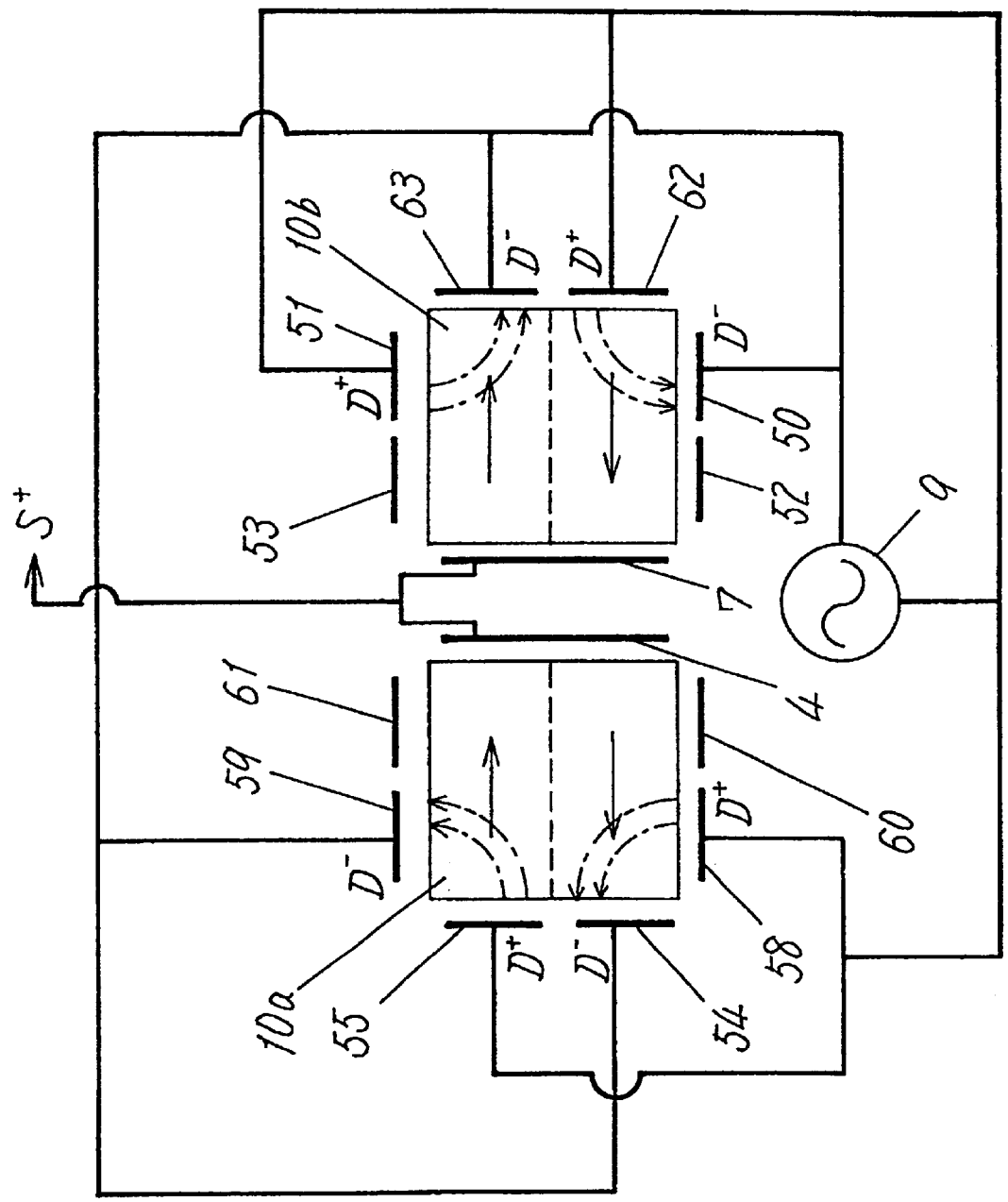
FIG. 8 is a schematic view of the positional arrangement of electrodes on arms in an angular rate sensor according to Embodiment 5 of the present invention.

FIG. 8 is a schematic view of the arrangement of electrodes on arms of an angular rate sensor according to Embodiment 5 of the present invention. In FIG. 8, like components are denoted by like numerals as those illustrated in FIG. 6 and will be described in no more detail but different components. In FIG. 8, reference numeral 58 denotes a driver electrode provided on a portion of the first main surface closer to the outer surface of the arm 10a. Reference numeral 59 denotes a driver electrode provided on a portion of the second main surface closer to the outer surface of the arm 10a. Reference numeral 60 denotes a monitor electrode provided on a portion of the first main surface closer to the inner surface of the arm 10a. Reference numeral 61 denotes a monitor electrode provided on a portion of the second main surface closer to the inner surface of the arm 10a. Reference numeral 62 denotes a driver electrode provided on a portion of the outer surface closer to the first main surface of the arm 10b. Reference numeral 63 denotes a driver electrode provided on a portion of the outer surface closer to the second main surface of the arm 10b.

An operation of the angular rate sensor of Embodiment 5 will be explained. To the driver electrodes 58, 55, 62, and 51 and the driver electrodes 59, 54, 50, and 63, alternating currents having different phases of 180 degrees from each other are applied from the driving source 9, respectively, hence producing a tuning fork oscillation.

In the embodiment, the intensity of electric field at regions of the arms 10a and 10b close to the outer surface is higher than that of the conventional sensor, as shown in FIG. 8. Accordingly, the efficiency of the driving operation increases to 3.4 times greater. As the number of monitor electrodes increases, a charge to be monitored increases hence declining the ratio of a noise to the input signal received by the AGC circuit 42.

In the embodiment, the drivers electrodes 58, 54, 55, 59, 50, 62, 63, and 51 are fairly spaced from the detector electrodes 4, 7 on the arms 10a, 10b. An influence of an undesired coupling capacitance component to the detector electrodes 4, 7 commonly-connected is reduced. Also, even if a small intensity of the electric field is applied to the detector electrodes 4, 7 from the driver electrodes 58, 54, 55, 59, 50, 62, 63, and 51, the undesired coupling capacitance component is offset to each other.

In the embodiment, the driver electrodes 54, 55 are mounted on the outer surface of the arm 10a. The detector electrode 4 is mounted on the inner surface of the arm. The driver electrode 58 and monitor electrode 60 are mounted on the first main surface of the arm. And the driver electrode 59 and monitor electrode 61 are mounted on the second main surface of the arm. The driver electrodes 54, 55 and detector electrode 4 may be switched over in the location, the driver electrode 58 and monitor electrode 60 may simultaneously be switched over in the location, and the driver electrode 59 and monitor electrode 61 may be simultaneously switched over in the location. In this case, an angular rate is detected with the differential signal of the detector electrodes 4 and 7.

In the embodiment, the driver electrodes 62, 63 are mounted on the outer surface of the arm 10b. The detector electrode 7 is mounted on the inner surface of the arm. The driver electrode 50 and monitor electrode 52 are mounted on the first main surface. The driver electrode 51 and monitor electrode 53 are mounted on the second main surface of the arm 10b. The locations of the driver electrodes 62, 63 and that of the detector electrode 7 may be switched over, the location of the driver electrode 50 and that of the monitor electrode 52 may be simultaneously switched over, and the location of the driver electrode 51 and that of the monitor electrode 53 may be simultaneously switched over. In this case, an angular rate is detected from the differential signal of the detector electrodes 4 and 7.

In the embodiment, the driver electrodes 54, 55 are mounted on the outer surface of the arm 10a. The detector electrode 4 is mounted on the inner surface of the arm. The driver electrode 58 and monitor electrode 60 are mounted on the first main surface of the arm. The driver electrode 59 and monitor electrode 61 are mounted on the second main surface of the arm. The driver electrodes 62, 63 are mounted on the outer surface of the arm 10b. The detector electrode 7 is mounted on the inner surface of the arm. The driver electrode 50 and monitor electrode 52 are mounted on the first main surface of the arm. The driver electrode 51 and monitor electrode 53 are mounted on the second main surface of the arm. The locations of the driver electrode 54, 55 and that of the detector electrode 4 may be switched over, the location of the driver electrode 58 and that of the monitor electrode 60 may be simultaneously switched over, the location of the driver electrode 59 and that of the monitor electrode 61 may be simultaneously switched over, and the locations of the driver electrodes 62, 63 and that of the detector electrode 7 may be simultaneously switched over, the location of the driver electrode 50 and that of the monitor electrode 52 may be simultaneously switched over, the location of the driver electrode 51 and that of the monitor electrode 53 may be simultaneously switched over. In this case, an angular rate is detected, similarly to Embodiment 5, with the detector electrodes 4 and 7 connected to a common port.

In the embodiment, the monitor electrodes 60, 61 are mounted on the first and second main surfaces of the arm 10a, respectively, while the monitor electrodes 52 and 53 are mounted on the first and second main surfaces of the other arm 10b, respectively. Alternatively, two of the monitor electrodes 52, 53, 60, and 61 are assigned as the monitor electrodes, and the other two may be grounding electrodes. This arrangement permits the grounding electrodes to be disposed between the driver electrode and the detector electrode, thus reducing an undesired coupling capacitance component transferred from the driver electrode to the detector electrode.

Embodiment 6

Figure 9:
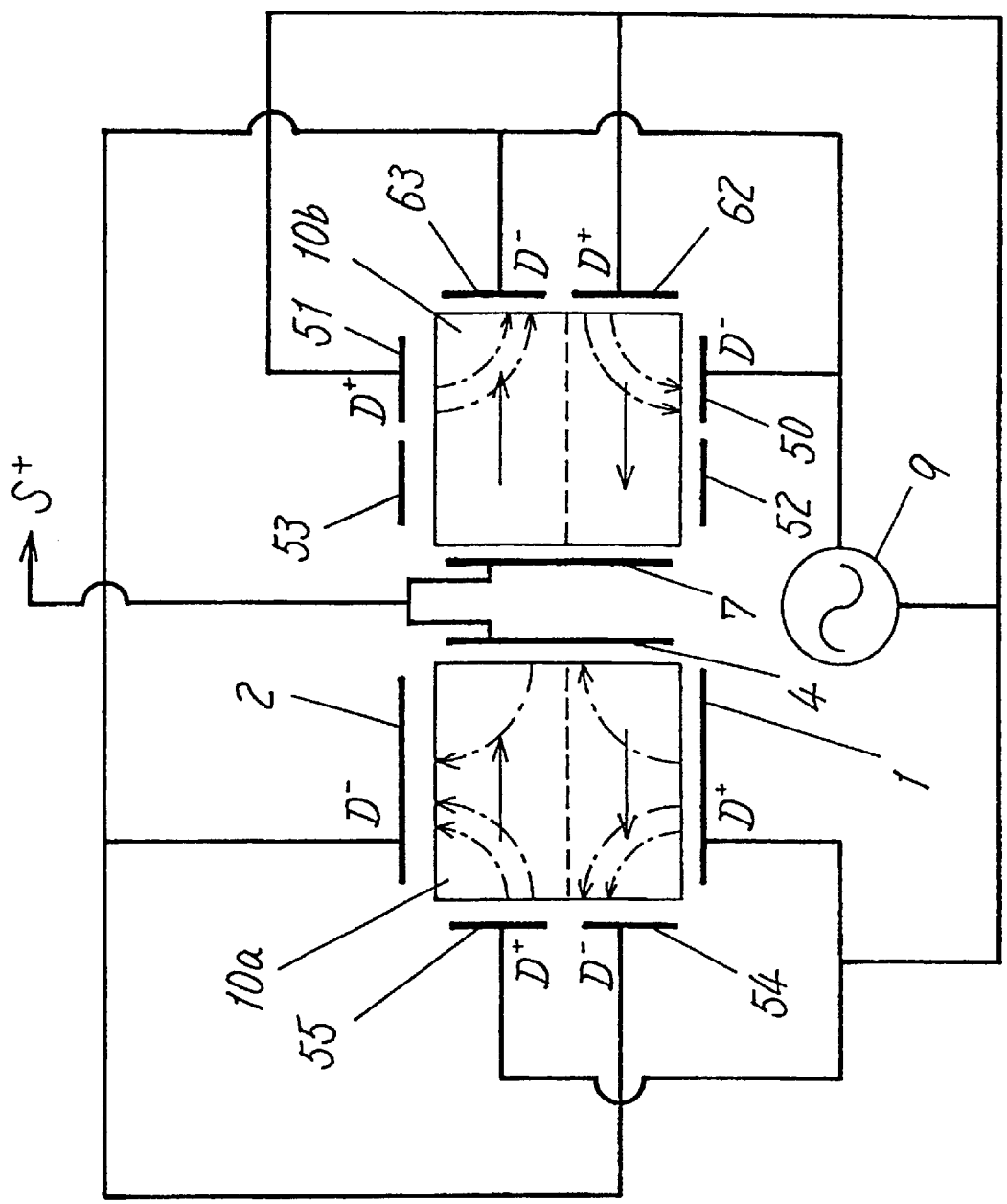
FIG. 9 is a schematic view of the positional arrangement of electrodes on arms in an angular rate sensor according to Embodiment 6 of the present invention.

FIG. 9 is a schematic view of the arrangement of electrodes on arms of an angular rate sensor according to Embodiment 6 of the present invention. In FIG. 9, like components are denoted by like numerals as those illustrated in FIGS. 3 and 8 and will be described in no more detail but different components.

An operation of the angular rate sensor of Embodiment 6 will be explained. To the driver electrodes 1, 55, 62, and 51 and the driver electrodes 52, 54, 50, and 63, alternating currents having a different phase of 180 degrees from each other are applied from the driving source 9, respectively, hence producing a tuning fork oscillation.

According to Embodiment 6, the intensity of electric field at regions of the arms 10a and 10b close to the outer surface is higher than that of the conventional sensor, as shown in FIG. 9. Accordingly, the efficiency of the driving operation increases to 3.7 times greater.

Also, a coupling capacitance component in an undesired signal component of the signal received by the detector electrode 4 of the arm 10a is eliminated. As the driver electrodes 50, 51, 62, and 63 are fairly spaced from the detector electrode 7 of the arm 10b, an influence of the coupling capacitance component on the detector electrode 7 is reduced. Furthermore, even when a small electric field generated by the driver electrodes 50, 51, 62, and 63 is applied to the detector electrode 7, the coupling capacitance component is canceled on the detector electrode 7.

In the embodiment, the driver electrodes 54 and 55 are mounted on the outer surface of the arm 10a. The detector electrode 4 is mounted on the inner surface of the arm. The driver electrode 1 is mounted on the first main surface. The driver electrode 2 is mounted on the second main surface of the arm. The locations of the driver electrodes 54, 55 and that of the detector electrode 4 may be switched over. In this case, the angular rate is detected from a differential signal of the detector electrodes 4 and 7.

In the embodiment, the driver electrodes 62, 63 are mounted on the outer surface of the arm 10b. The detector electrode 7 is mounted on the inner surface of the arm. The driver electrode 50 and monitor electrode 52 are mounted on the first main surface of the arm. The driver electrode 51 and monitor electrode 53 are mounted on the second main surface of the arm. The locations of the driver electrodes 62, 63 and that of the detector electrode 7 may be switched over, the location of the driver electrode 50 and that of the monitor electrode 52 may be simultaneously switched over, the location of the driver electrode 51 and that of the monitor electrode 53 may be simultaneously switched over. In this case, the angular rate signal is calculated from the differential signal of the detector electrodes 4 and 7.

In the embodiment, the driver electrodes 54 and 55 are mounted on the outer surface of the arm 10a. The detector electrode 4 is mounted on the inner surface of the arm. The driver electrode 1 is mounted on the first main surface of the arm. The driver electrode 2 is mounted on the second main surface of the arm. The driver electrodes 62 and 63 are mounted on the outer surface of the arm 10b. The detector electrode 7 is mounted on the inner surface of the arm 10b. The driver electrode 50 and monitor electrode 52 are mounted on the first surface of the arm 10b. The driver electrode 51 and monitor electrode 53 are mounted on the second main surface of the arm 10b. The locations of the driver electrode 54, 55 and that of the detector electrode 4 may be switched over, the locations of the driver electrodes 62, 63 and that of the detector electrode 7 may be simultaneously switched over, the location of the driver electrode 50 and that of the monitor electrode 52 may be simultaneously switched over, the location of the driver electrode 51 and that of the monitor electrode 53 may be simultaneously switched over. In this case, the angular rate is detected with the detector electrodes 4 and 7 connected to a common port, similarly to Embodiment 6.

Embodiment 7

Figure 10:
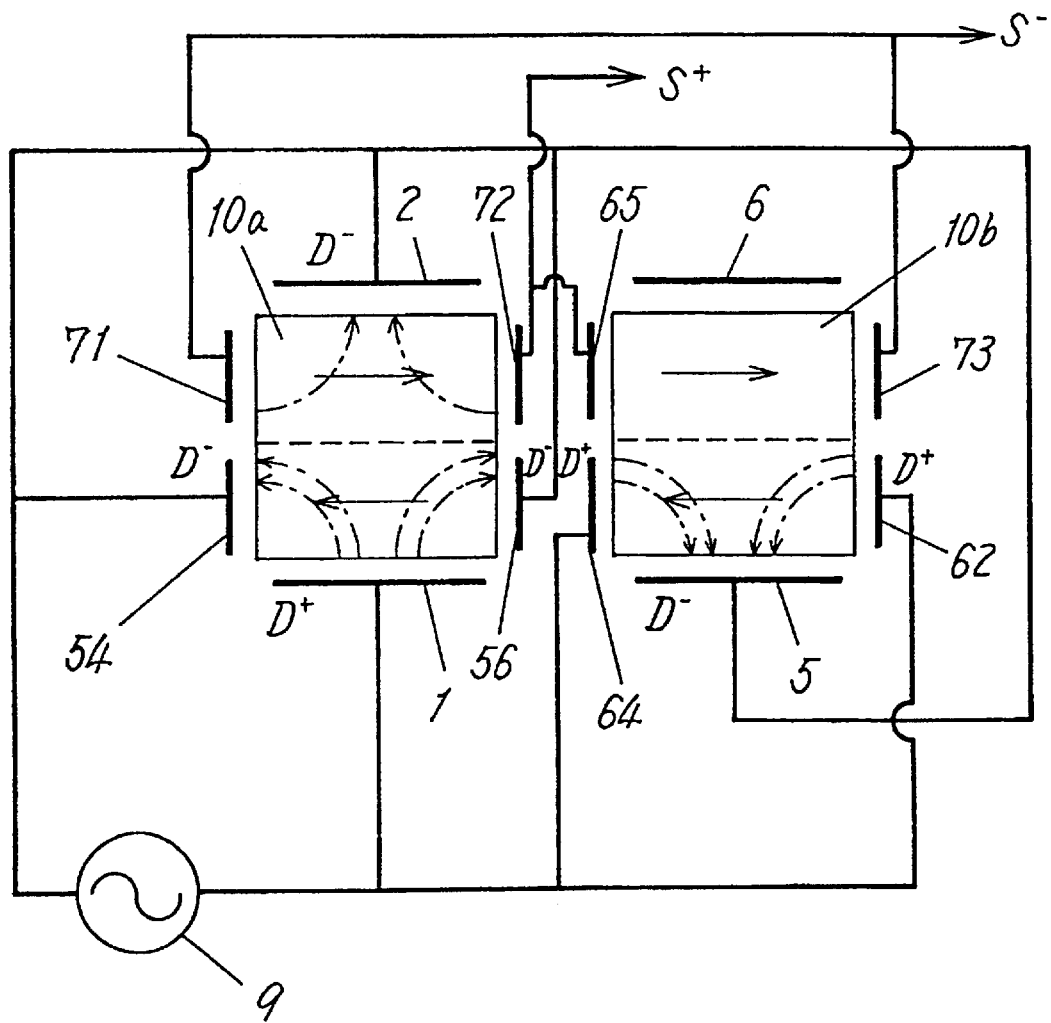
FIG. 10 is a schematic view of the positional arrangement of electrodes on arms in an angular rate sensor according to Embodiment 7 of the present invention.

FIG. 10 is a schematic view of the arrangement of electrodes on arms of an angular rate sensor according to Embodiment 7 of the present invention. In FIG. 10, like components are denoted by like numerals as those illustrated in FIGS. 7 and 9 and will be described in no more detail but different components. In FIG. 10, reference numeral 64 denotes a driver electrode provided on a portion of the inner surface closer to the first main surface of the arm 10b. Reference numeral 65 denotes a detector electrode provided on a portion of the inner surface closer to the second main surface of the arm 10b. Reference numeral 71 denotes a detector electrode provided on a portion of the outer surface closer to the second main surface of the arm 10a. Reference numeral 72 denotes a detector electrode provided on a portion of the inner surface closer to the second main surface of the arm 10a. Reference numeral 73 denotes a detector electrode provided on a portion of the outer surface closer to the second main surface of the arm 10b.

An operation of the angular rate sensor of Embodiment 7 will be explained. To the driver electrodes 1, 64, and 62 and the driver electrodes 2, 5, 54, and 56, alternating currents having a different phase of 180 degrees from each other are applied from the driving source 9 in Embodiment 7, hence producing a tuning fork oscillation.

According to Embodiment 7, the electrodes for applying a driving voltage are more than those of the conventional sensor, and the intensity of electric field at regions of the arms 10a and 10b close to the first main surface is higher. Accordingly, the efficiency of the driving operation increases to 3.2 times greater.

Also, a coupling capacitance component in an undesired signal component in the driving signal received by the detector electrode is eliminated.

Embodiment 8

Figure 11:
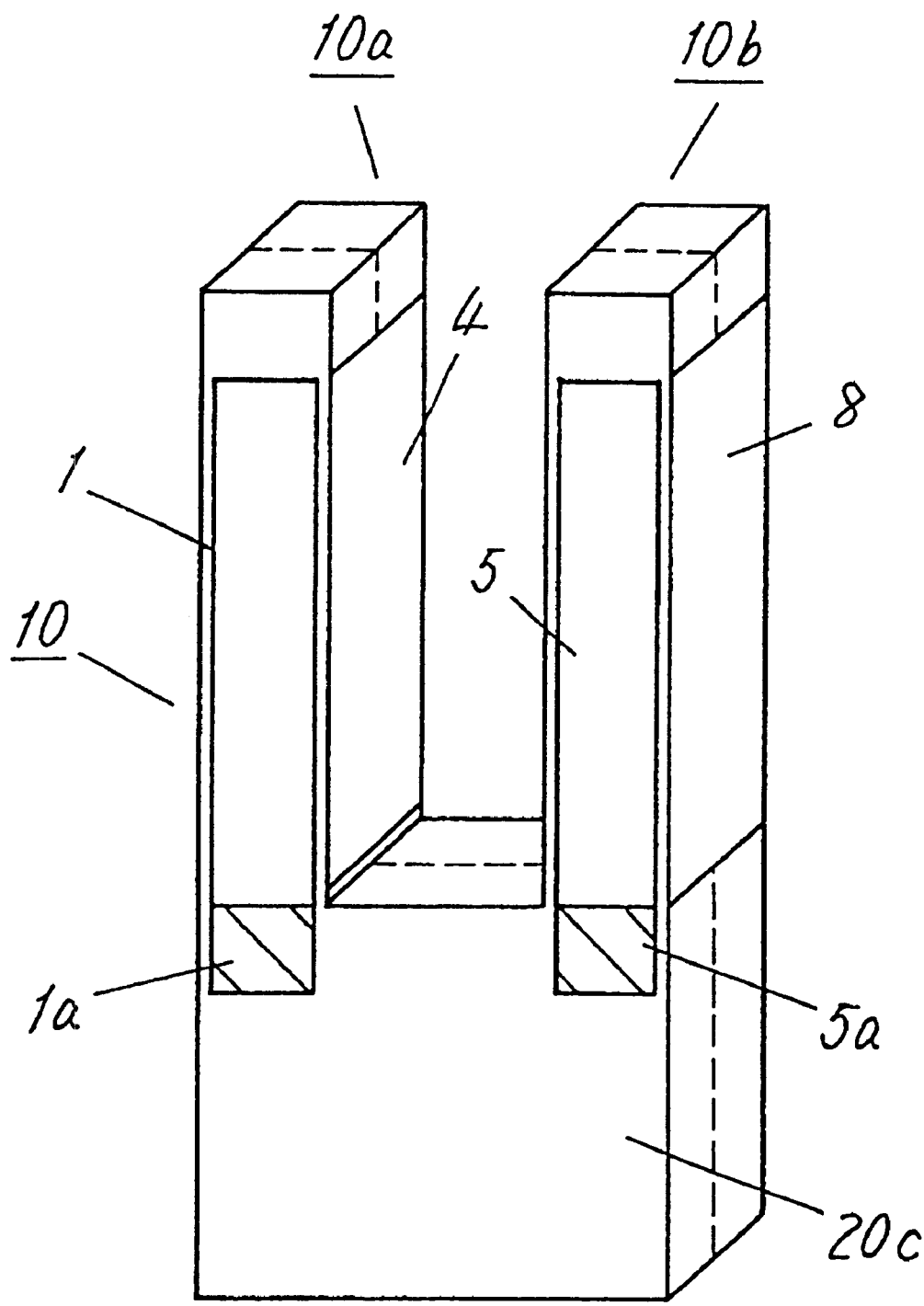
FIG. 11 is a perspective view of a tuning fork oscillator, seen from its first main surface of an angular rate sensor according to Embodiment 8 of the present invention.
Figure 12:
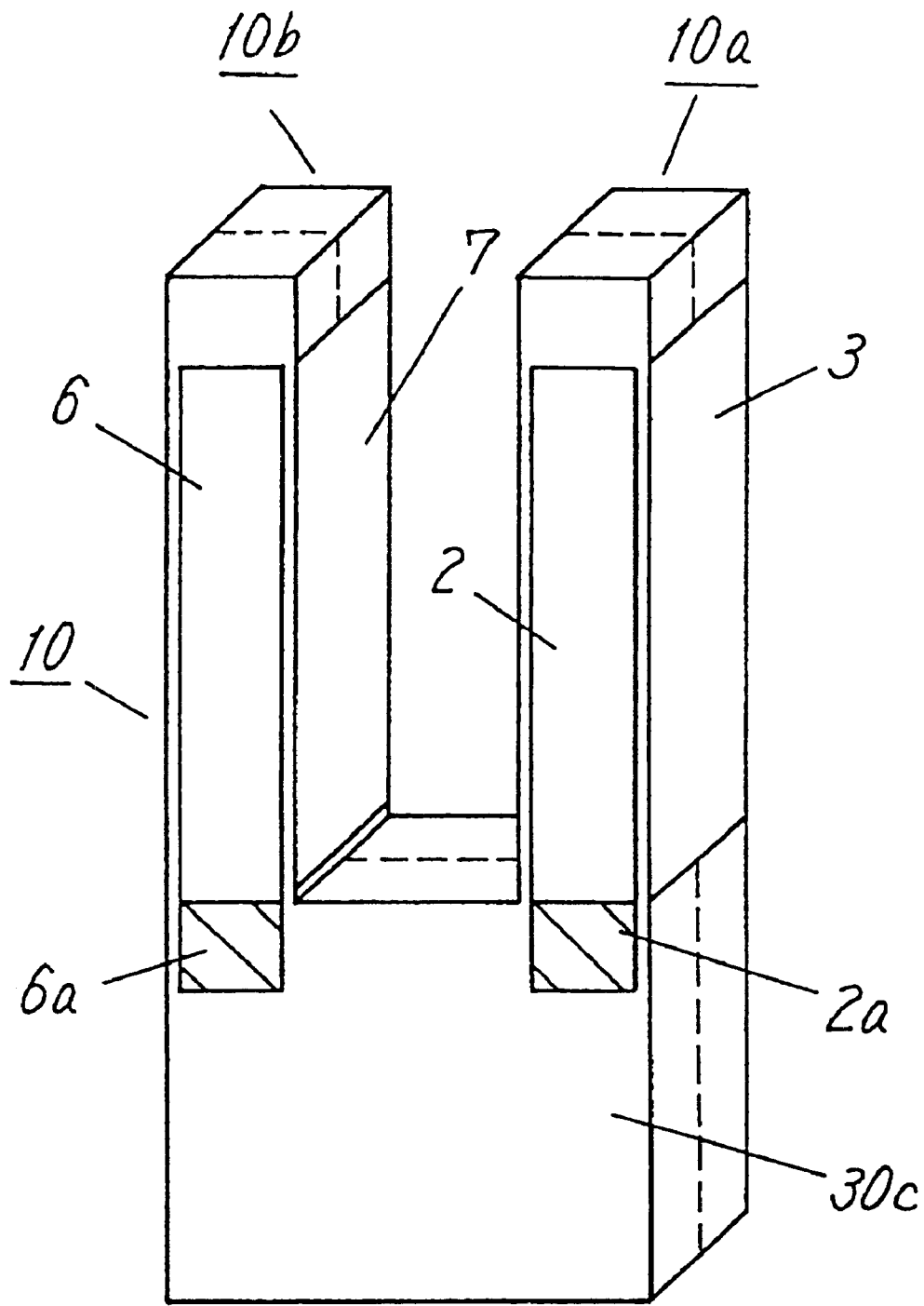
FIG. 12 is a perspective view of the tuning fork oscillator seen from a second main surface.

FIGS. 11, 13 and FIGS. 12, 14 are perspective views of a tuning fork oscillator of an angular sensor, seen from the first and second main surfaces, respectively, according to Embodiment 8 of the present invention. Throughout FIGS. 11, 12, 13, and 14, like components are denoted by like numerals as those illustrated in FIGS. 1, 2, and 3 and will be explained in no more detail but different components. In FIG. 11, reference numeral 1a denotes an electrode extension of the electrode 1 provided on the first main surface of an arm 10a and arranged extending into a base 20c. Reference numeral 5a denotes an electrode extension of the electrode 5 provided on the first main surface of a arm 10b and arranged extending into a base 20c. In FIG. 12, reference numeral 2a denotes an electrode extension of the electrode 2 provided on the second main surface of an arm 10a and arranged extending into a base 30c. Reference numeral 6a denotes an electrode extension of the electrode 6 provided on the second main surface of an arm 10b and arranged extending into a base 30c.

As each driver electrode of Embodiment 8 extends into the base 10c longer than that of the conventional sensor, the total area of the electrodes increases thus improving the efficiency of the driving operation.

Figure 13:
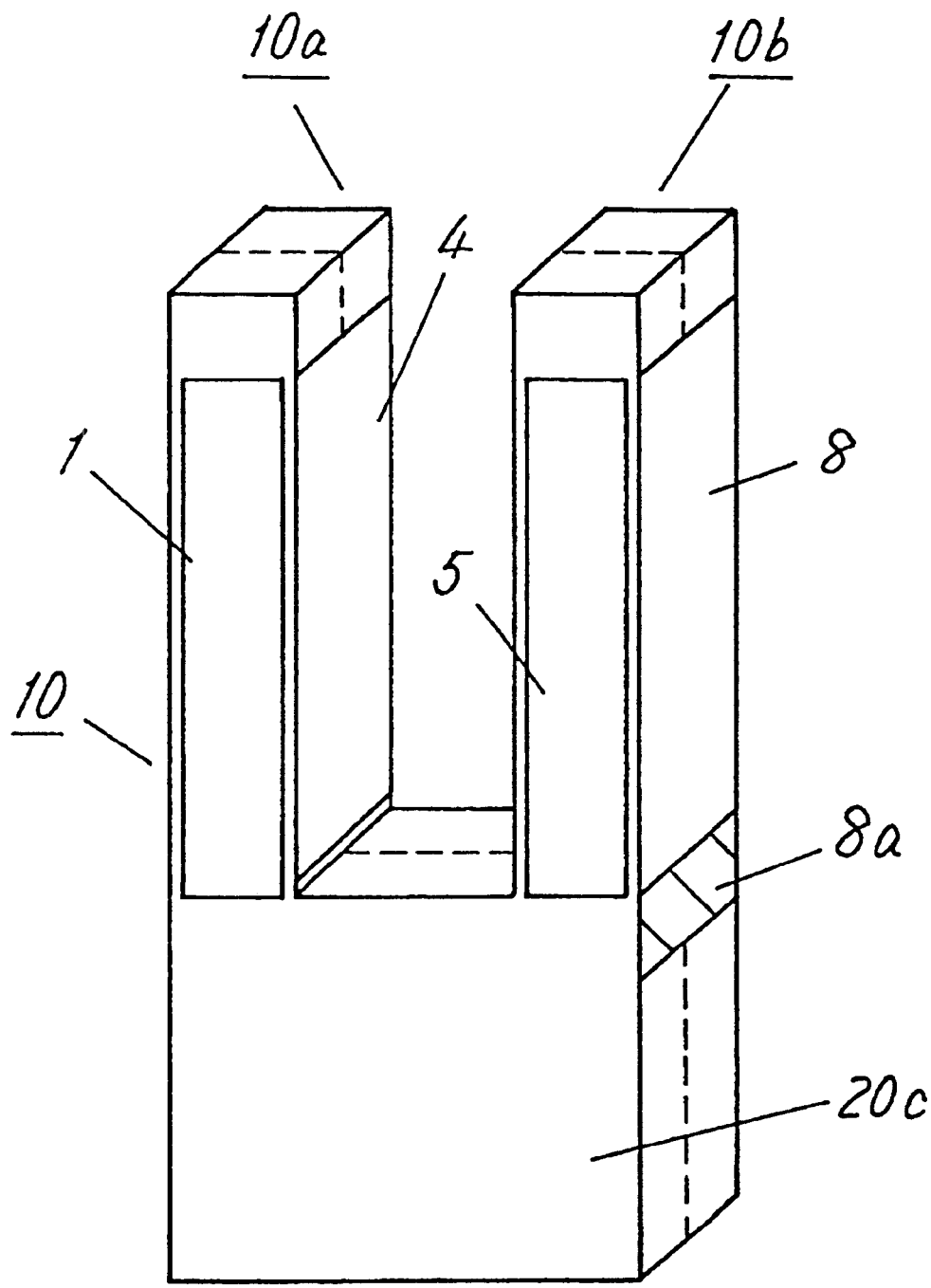
FIG. 13 is a perspective view of a modification of the same seen from a first main surface.
Figure 14:
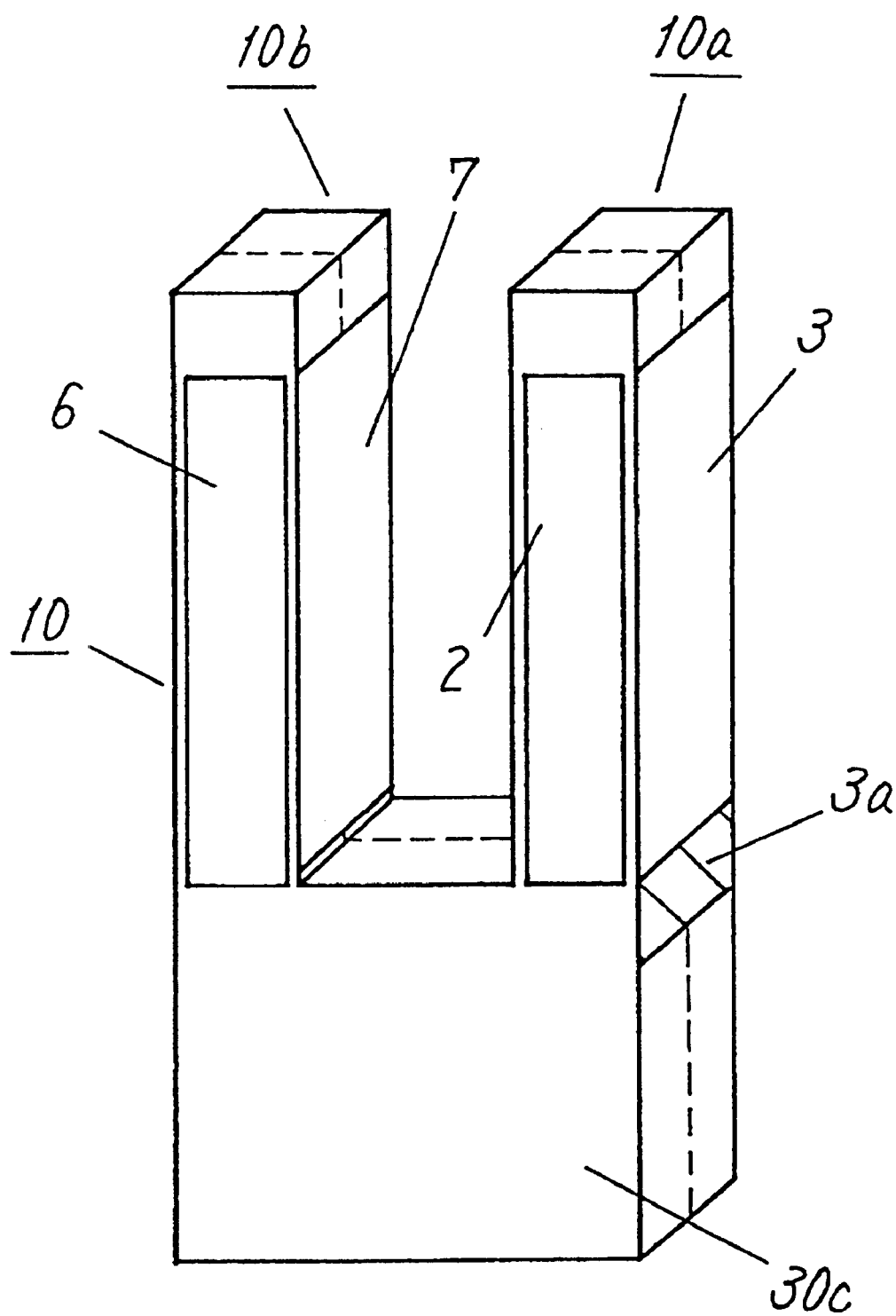
FIG. 14 is a perspective view of a modification of the same seen from a second main surface.
Figure 15:
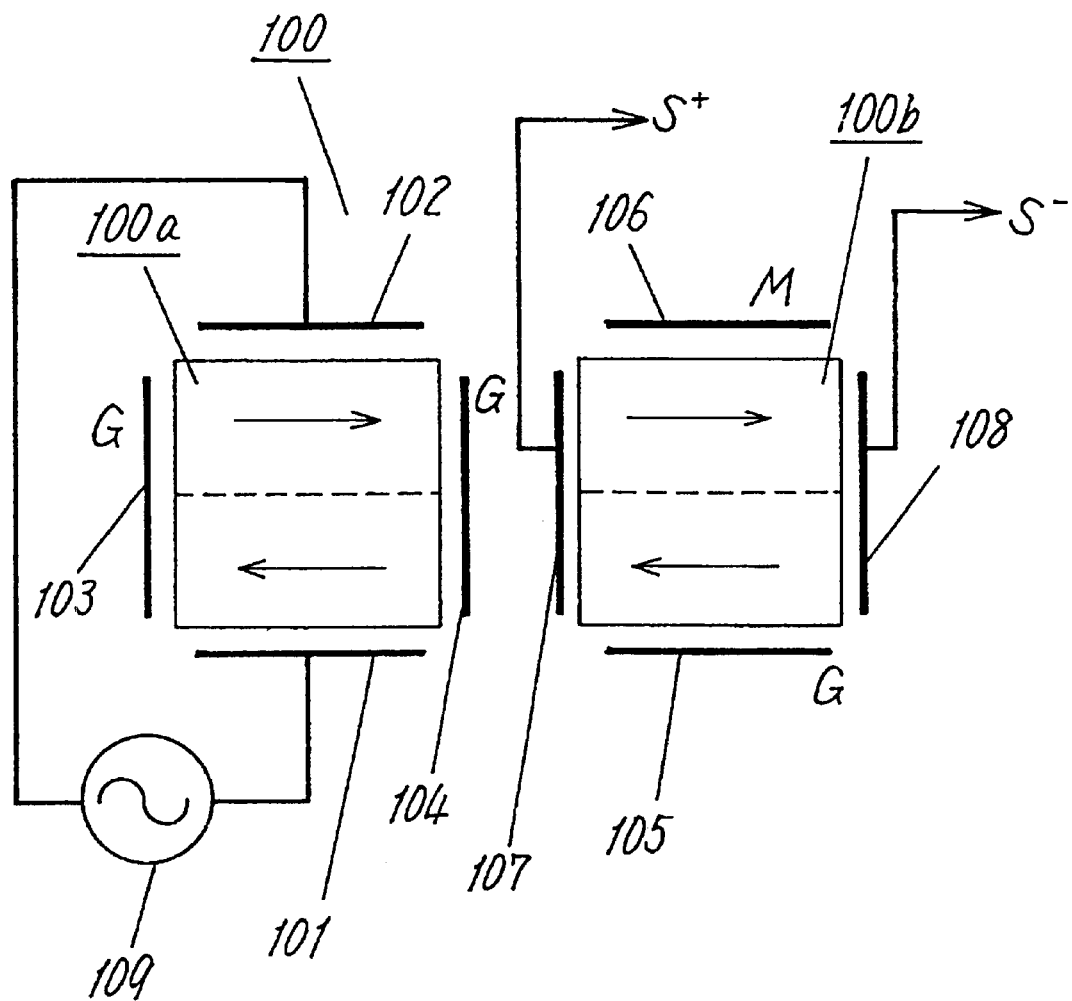
FIG. 15 is a schematic view illustrating the positional arrangement of electrodes on arms in a conventional angular rate sensor.

Also, as shown in FIGS. 13 and 14, reference numeral 8a denotes an electrode extension of the detector electrode 8 provided on the outer surface of the arm 10b and arranged extending into the base 10c. Reference numeral 3a denotes an electrode extension of the detector electrode 3 provided on the outer surface of the arm 10a and arranged extending into the base 10c.

As each detector electrode of Embodiment 8 extends into the base 10c longer than that of the conventional sensor, the total area of the electrodes increases thus improving the efficiency of the detecting operation.

In the embodiment, the electrodes on the arms 10a and 10b described above extends into the base 10c. The separated electrodes on the arms, such as shown in any of Embodiments 2 to 7, may extend into the base 10c.

Industrial Applicability

As set forth above, an angular rate sensor according to the present invention includes a tuning fork oscillator having a first oscillator member of a single crystalline piezoelectric material composed of at least two arms and a base joining the two arms and a second oscillator member of the single crystalline piezoelectric material having a substantially identical shape to the first oscillator member. The two oscillators are bonded directly to each other in the direction of the crystallographic axis and the thickness so that opposite polarities of a piezoelectric effect my be developed along the widthwise direction of the oscillators. The tuning fork oscillator includes at least two arms and a base. The sensor further includes: first, second, third, and fourth electrodes provided on a first main surface, a second main surface, an outer surface, and an inner surface of one of the two arms of the tuning fork oscillator, respectively; a fifth electrode provided on either a first main surface or a second main surface of the other arm of the tuning fork oscillator; and sixth and seventh electrodes provided on an inner surface and an outer surface of the other arm of the tuning fork oscillator, respectively. When the fifth electrode is provided on the first main surface, a driving voltage is applied to the second and fifth electrodes at the same polarity, and applied to the first electrode at the reverse polarity against the second and fifth electrodes. When the fifth electrode is provided on the second main surface, a driving voltage is applied to the second and fifth electrodes at the reverse polarity against each other, and applied to the first electrode at the same polarity as the fifth electrode. The angular rate sensor includes more electrodes to which the driving voltage is applied and has the efficiency of a driving operation improved.

What is claimed is:

1. An angular rate sensor comprising:
a tuning fork oscillator having at least two arms and a base, including:
a first oscillator member of a single crystalline piezoelectric material having at least two arms and a base joining the two arms; and
a second oscillator member of the single crystalline piezoelectric material having a shape substantially identical to a shape of said first oscillator member, said first and second oscillator members being bonded directly to each other in a direction of a thickness and in a direction of a crystallographic axis so that opposite polarities of a piezoelectric effect may be developed along a widthwise direction of said first and second oscillator members;
first, second, third, and fourth electrodes provided on a first main surface, a second main surface, an outer surface, and an inner surface of one of the arms of said tuning fork oscillator, respectively;

a fifth electrode provided on one of first and second main surfaces of other arm of the arms of said tuning fork oscillator; and sixth and seventh electrodes provided on inner and outer surfaces of the other arm of said tuning fork oscillator, respectively;

wherein, when said fifth electrode is provided on the first main surface, a driving voltage is applied to said second and fifth electrodes at a polarity identical to each other and applied to said first electrode at a polarity opposite to said second and fifth electrodes; and wherein, when said fifth electrode is provided on the second main surface, a driving voltage is applied to said second and fifth electrodes at polarities opposite to each other and applied to said first electrode at a polarity identical to said fifth electrode.

2. The angular rate sensor according to claim 1, wherein said third and seventh electrodes are connected to a common port, said fourth and sixth electrodes are connected to another common port, and a detection signal is detected from a differential signal between the common ports.

3. An angular rate sensor comprising:

a tuning fork oscillator having at least two arms and a base, including:
 a first oscillator member of a single crystalline piezoelectric material having at least two arms and a base joining the two arms; and
 a second oscillator member of the single crystalline piezoelectric material having a shape substantially identical to a shape of said first oscillator member, said first and second oscillator members being bonded directly to each other in a direction of a thickness and in a direction of a crystallographic axis so that opposite polarities of a piezoelectric effect may be developed along a widthwise direction of said first and second oscillator members;

first, second, third, and fourth electrodes provided on a first main surface, a second main surface, an outer surface, and an inner surface of one of the arms of said tuning fork oscillator, respectively;

fifth and sixth electrodes provided on first and second main surfaces of other arm of the arms of said tuning fork oscillator, respectively, said fifth and sixth electrodes being provided on portions close to one of outer and inner surfaces of the other arm, respectively; and a seventh electrode provided on a surface of the other arm of said tuning fork oscillator;

wherein, when said fifth and sixth electrodes are provided on the portions close to the outer surface of the other arm, respectively, said seventh electrode is provided on the outer surface;

wherein, when said fifth and sixth electrodes are provided on the portions close to the inner surface of the other arm, respectively, said seventh electrode is provided on the inner surface; and wherein a driving voltage is applied to said first and sixth electrodes at a polarity identical to each other and applied to said second and fifth electrodes at a polarity opposite to said first and sixth electrodes.

4. The angular rate sensor according to claim 3, further comprising an eighth electrode provided on a surface opposite to the surface of the other arm of said tuning fork oscillator on which said seventh electrode is provided;

wherein, when said seventh electrode is provided on the outer surface, said fourth and eight electrodes are connected to a common port, said third and seventh electrodes are connected to another common port, and a detection signal is detected from a differential signal between the common ports; and wherein, when said seventh electrode is provided on the inner surface, said third and eight electrodes are connected to a common port, said fourth and seventh electrodes are connected to another common port, and a detection signal is detected from a differential signal between the common ports.

5. An angular rate sensor comprising:

a tuning fork oscillator having at least two arms and a base, including:
 a first oscillator member of a single crystalline piezoelectric material having at least two arms and a base joining the two arms; and
 a second oscillator member of the single crystalline piezoelectric material having a shape substantially identical to a shape of said first oscillator member, said first and second oscillator members being bonded directly to each other in a direction of a thickness and in a direction of a crystallographic axis so that opposite polarities of a piezoelectric effect may be developed along a widthwise direction of said first and second oscillator members;

first, second, third, and fourth electrodes provided on a first main surface, a second main surface, an outer surface, and an inner surface of one of the arms of said tuning fork oscillator, respectively; and fifth, sixth, seventh, and eighth electrodes provided on a first main surface, a second main surface, an outer surface, and an inner surface of other arm of the arms of said tuning fork oscillator, respectively;

wherein, when said fifth electrode is provided on a portion close to the outer surface of the other arm, said sixth electrode is provided on a portion close to the inner surface of the other arm;

wherein, when said fifth electrode is provided on a portion close to the inner surface of the other arm, said sixth electrode is provided on a portion close to the outer surface of the other arm; and wherein a driving voltage is applied to said first and sixth electrodes at a polarity identical to each other and applied to said second and fifth electrodes at a polarity opposite to said first and sixth electrodes.

6. The angular rate sensor according to claim 5, wherein a detection signal is detected from a differential signal between said third and fourth electrodes.

7. An angular rate sensor comprising:

a tuning fork oscillator having at least two arms and a base, including:
 a first oscillator member of a single crystalline piezoelectric material having at least two arms and a base joining the two arms; and
 a second oscillator member of the single crystalline piezoelectric material having a shape substantially identical to a shape of said first oscillator member, said first and second oscillator members being bonded directly to each other in a direction of a thickness and in a direction of a crystallographic axis so that opposite polarities of a piezoelectric effect may be developed along a widthwise direction of said first and second oscillator members;

first and second electrodes provided on first and second main surfaces of one of the arms of said tuning fork oscillator, respectively;

third and fourth electrodes provided on one of outer and inner surfaces of the one of the arms, said third and fourth electrodes being provided on a portion close to said first electrode and a portion close to said second electrode, respectively; and a fifth electrode provided on a surface opposite to the surface on which said third and fourth electrodes are provided;

wherein a driving voltage is applied to said first and fourth electrodes at a polarity identical to each other and applied to said second and third electrodes at a polarity opposite to said first and fourth electrodes.

8. The angular rate sensor according to claim 7, further comprising sixth and seventh electrodes provided on inner and outer surfaces of the other arm of said tuning fork oscillator, respectively;

wherein, when said fifth electrode is provided on the inner surface of the one of the arms, a detection signal is detected from a differential signal between said sixth and seventh electrodes, or said fifth and sixth electrodes are connected to a common port, and a detection signal is detected from a differential signal between the common port and said seventh electrode; and wherein, when said fifth electrode is provided on the outer surface of the one of the arms, a detection signal is detected from a differential signal between said sixth and seventh electrodes, or said fifth and seventh electrodes are connected to a common port, and a detection signal is detected from a differential signal between the common port and said sixth electrode.

9. The angular rate sensor according to claim 7, further comprising:

a sixth electrode provided on one of first and second main surfaces of the other arm of said tuning fork oscillator; and seventh and eighth electrodes provided on inner and outer surfaces of the other arm, respectively;

wherein, when said sixth electrode is provided on the first main surface, a driving voltage is applied to said first and sixth electrodes at polarities opposite to each other; and wherein, when said sixth electrode is provided on the second main surface, a driving voltage is applied to said first and sixth electrodes at a polarity identical to each other.

10. The angular rate sensor according to claim 9, wherein:

when said fifth electrode is provided on the inner surface of the one of the arms, a detection signal is detected from a differential signal between said seventh and eighth electrodes, or said fifth and seventh electrodes are connected to a common port, and a detection signal is detected from a differential signal between the common port and said eighth electrode; and when said fifth electrode is provided on the outer surface of the one of the arms, a detection signal is detected from a differential signal between said seventh and eighth electrodes, or said fifth and eight electrodes are connected to a common port, and a detection signal is detected from a differential signal between the common port and said seventh electrode.

11. An angular rate sensor comprising:

a tuning fork oscillator having at least two arms and a base, including:

a first oscillator member of a single crystalline piezoelectric material having at least two arms and a base joining the two arms; and a second oscillator member of the single crystalline piezoelectric material having a shape substantially identical to a shape of said first oscillator member, said first and second oscillator members being bonded directly to each other in a direction of a thickness and in a direction of a crystallographic axis so that opposite polarities of a piezoelectric effect may be developed along a widthwise direction of said first and second oscillator members;

first and second electrodes provided on first and second main surfaces of one of the arms of said tuning fork oscillator, respectively;

third and fourth electrodes provided on an outer surface of the one of the arms, said third and fourth electrodes being provided on a portion close to said first electrode and a portion close to said second electrode, respectively; and fifth and sixth electrodes provided on an inner surface of the one of the arms, said fifth and sixth electrodes being provided on a portion close to said first electrode and a portion close to said second electrode, respectively;

wherein a driving voltage is applied to said first, fourth, and sixth electrodes at a polarity identical to one another and applied to said second, third, and fifth electrodes at a polarity opposite to said first, fourth, and sixth electrodes.

12. The angular rate sensor according to claim 11, further comprising seventh and eighth electrodes provided on inner and outer surfaces of the other arm of said tuning fork oscillator, respectively, wherein a detection signal is detected from a differential signal between said seventh and eighth electrodes.

13. The angular rate sensor according to claim 11, further comprising:

a seventh electrode provided on one of first and second main surfaces of other arm of the arms of said tuning fork oscillator; and eighth and ninth electrodes provided on inner and outer surfaces of the other arm, respectively;

wherein, when said seventh electrode is provided on the first main surface, a driving voltage is applied to said first and seventh electrodes at polarities opposite to each other; and wherein, when said seventh electrode is provided on the second main surface, a driving voltage is applied to said first and seventh electrodes at a polarity identical to each other.

14. The angular rate sensor according to claim 13, wherein a detection signal is detected from a differential signal between said eighth and ninth electrodes.

15. An angular rate sensor comprising:

a tuning fork oscillator having at least two arms and a base, including:

a first oscillator member of a single crystalline piezoelectric material having at least two arms and a base joining the two arms; and a second oscillator member of the single crystalline piezoelectric material having a shape substantially identical to a shape of said first oscillator member, said first and second oscillator members being bonded directly to each other in a direction of a thickness and in a direction of a crystallographic axis so that opposite polarities of a piezoelectric effect may be developed along a widthwise direction of said first and second oscillator members;

first and second electrodes provided on first and second main surfaces of one of the arms of said tuning fork oscillator, respectively, said first and second electrodes being provided on portions close to an outer surface of the one of the arms, respectively;

third and fourth electrodes provided on the outer surface of the one of the arms, said third and fourth electrodes being provided on a portion close to the first main surface of the one of the arms and a portion close to the second main surface of the one of the arms, respectively;

fifth and sixth electrodes provided on first and second main surfaces of other arm of the arms of said tuning fork oscillator, said fifth and sixth electrodes being provided on portions close to an outer surface of the other arm of said tuning fork oscillator, respectively; and seventh and eighth electrodes provided on the outer surface of the other arm, said seventh and eighth electrodes being provided on a portion close to the first main surface of the other arm and a portion close to the second main surface of the of the arm, respectively;

wherein a driving voltage is applied to said first, fourth, sixth, and seventh electrodes at a polarity identical to one another and applied to said second, third, fifth, and eighth electrodes at a polarity opposite to said first, fourth, sixth, and seventh electrodes.

16. The angular rate sensor, according to claim 7, further comprising electrodes provided on inner surfaces of the arms of said tuning fork oscillator, respectively, wherein said electrodes being connected to a common port, and a detection signal is detected from the common port.

17. An angular rate sensor comprising:
a tuning fork oscillator having at least two arms and a base, including:
a first oscillator member of a single crystalline piezoelectric material having at least two arms and a base joining the two arms;
a second oscillator member of the single crystalline piezoelectric material having a shape substantially identical to a shape of said first oscillator member, said first and second oscillator members being bonded directly to each other in a direction of a thickness and in a direction of a crystallographic axis so that opposite polarities of a piezoelectric effect may be developed along a widthwise direction of said first and second oscillator members;

first and second electrodes provided on first and second main surfaces of one of the arms of said tuning fork oscillator, respectively, said first and second electrodes being provided on portions close to an inner surface of the one of the arms, respectively;

third and fourth electrodes provided on the inner surface of the one of the arms, said third and fourth electrodes being provided on a portion close to the first main surface of the one of the arms and a portion close to the second main surface of the one of the arms, respectively;

fifth and sixth electrodes provided on first and second main surfaces of other arm of the arms of said tuning fork oscillator, respectively, said fifth and sixth electrodes being provided on portions close to an inner surface of the other arm, respectively; and seventh and eighth electrodes provided on the inner surface of the other arm, said seventh and eighth electrodes being provided on a portion close to the first main surface of the other arm and a portion close to the second main surface of the other arm, respectively;

wherein a driving voltage is applied to said first, fourth, sixth, and seventh electrodes at a polarity identical to one another and applied to said second, third, fifth, and eighth electrodes at a polarity opposite to said first, fourth, sixth, and seventh electrodes.

18. The angular rate sensor according to claim 17, further comprising electrodes provided on outer surfaces of the arms of said tuning fork oscillator, respectively, wherein said electrodes are connected to a common port, and a detection signal is detected from the common port.

19. An angular rate sensor comprising:
a tuning fork oscillator having at least two arms and a base, including:
a first oscillator member of a single crystalline piezoelectric material having at least two arms and a base joining the two arms; and
a second oscillator member of the single crystalline piezoelectric material having a shape substantially identical to a shape of said first oscillator member, said first and second oscillator members being bonded directly to each other in a direction of a thickness and in a direction of a crystallographic axis so that opposite polarities of a piezoelectric effect may be developed along a widthwise direction of said first and second oscillator members;

first and second electrodes provided on first and second main surfaces of one of the arms of said tuning fork oscillator, respectively, said first and second electrodes being provided on portions close to an outer surface of the one of the arms, respectively;

third and fourth electrodes provided on the outer surface of the one of the arms, said third and fourth electrodes being provided on a portion close to the first main surface of the one of the arms and a portion close to the second main surface of the one of the arms, respectively;

fifth and sixth electrodes provided on first and second main surfaces of other arm of the arms of said tuning fork oscillator, respectively, said fifth and sixth electrodes being provided on portions close to an inner surface of the other arm, respectively; and seventh and eighth electrodes provided on the inner surface of the other arm, said seventh and eighth electrodes being provided on a portion close to the first main surface of the other arm and a portion close to the second main surface of the other arm, respectively;

wherein a driving voltage is applied to said first, fourth, sixth, and seventh electrodes at a polarity identical to one another and applied to said second, third, fifth, and eighth electrodes at a polarity opposite to said first, fourth, sixth, and seventh electrodes.

20. The angular rate sensor according to claim 19, further comprising:
a ninth electrode provided on an inner surface of the one of the arms of said tuning fork oscillator; and
a tenth electrode provided on an outer surface of the other arm, wherein a detection signal is detected from a differential signal between said ninth and tenth electrodes.

21. An angular rate sensor comprising:
a tuning fork oscillator having at least two arms and a base, including:
a first oscillator member of a single crystalline piezoelectric material having at least two arms and a base joining the two arms; and
a second oscillator member of the single crystalline piezoelectric material having a shape substantially identical to a shape of said first oscillator member, said first and second oscillator members being bonded directly to each other in a direction of a thickness and in a direction of a crystallographic axis so that opposite polarities of a piezoelectric effect may be developed along a widthwise direction of said first and second oscillator members;

first and second electrodes provided on first and second main surfaces of one of the arms of said tuning fork oscillator, respectively, said first and second electrodes being provided on portions close to an inner surface of the one of the arms, respectively;

third and fourth electrodes provided on the inner surface of the one of the arms, said third and fourth electrodes being provided on a portion close to the first main surface of the one of the arms and a portion close to the second main surface of the one of the arms, respectively;

fifth and sixth electrodes provided on first and second main surfaces of other arm of the arms of said tuning fork oscillator, respectively, said fifth and sixth electrodes being provided on portions close to an outer surface of the other arm, respectively; and seventh and eighth electrodes provided on the outer surface of the other arm, said seventh and eighth electrodes being provided on a portion close to the first main surface of the other arm and a portion close to the second main surface of the other arm, respectively;

wherein a driving voltage is applied to said first, fourth, sixth, and seventh electrodes at a polarity identical to one another and applied to said second, third, fifth, and eighth electrodes at a polarity opposite to said first, fourth, sixth, and seventh electrodes.

22. The angular rate sensor according to claim 21, further comprising:

a ninth electrode provided on an outer surface of the one of the arms of said tuning fork oscillator; and a tenth electrode provided on an inner surface of the other arm, wherein a detection signal is detected from a differential signal between said ninth and tenth electrodes.

23. The angular rate sensor according to claim 15, further comprising four monitor electrodes provided on remaining portions of the first and second main surfaces of the arms of said tuning fork oscillator, respectively.

24. The angular rate sensor according to claim 16, further comprising:

two grounding electrodes provided on remaining portions of the first and second main surfaces of the one of the arms of said tuning fork oscillator, respectively; and two monitor electrodes provided on remaining portions of the first and second main surfaces of the other arm.

25. An angular rate sensor comprising:

a tuning fork oscillator having at least two arms and a base, including:

a first oscillator member of a single crystalline piezoelectric material having at least two arms and a base joining the two arms; and a second oscillator member of the single crystalline piezoelectric material having a shape substantially identical to a shape of said first oscillator member, said first and second oscillator members being bonded directly to each other in a direction of a thickness and in a direction of a crystallographic axis so that opposite polarities of a piezoelectric effect may be developed along a widthwise direction of said first and second oscillator members;

first and second electrodes provided on first and second main surfaces of one of the arms of said tuning fork oscillator, respectively;

third and fourth electrodes provided on one of outer and inner surfaces of the one of the arms, said third and fourth electrodes being provided on a portion close to said first electrode and a portion close to said second electrode, respectively;

a fifth electrode provided on one of the inner and outer surfaces of the one of the arms, said fifth electrode being provided on a surface opposite to the surface on which said third and fourth electrodes are provided;

sixth and seventh electrodes provided on first and second main surfaces of other arm of said arms of the tuning fork oscillator, respectively, said sixth and seventh electrodes being provided on portions close to an outer surface of the other arm, respectively; and eighth and ninth electrodes provided on the outer surface of the other arm, said eighth and ninth electrodes being provided on a portion close to said sixth electrode and a portion close to said seventh electrode, respectively, wherein a driving voltage is applied to said first, fourth, seventh, and eighth electrodes at a polarity identical to one another and applied to said second, third, sixth, and ninth electrodes at a polarity opposite to said first, fourth, seventh, and eighth electrodes.

26. The angular rate sensor according to claim 25, further comprising:

a tenth electrode provided on an inner surface of the other arm of said tuning fork oscillator; and two monitor electrodes provided on remaining portions of the first and second main surfaces of the other arm, respectively;

wherein, when said fifth electrode is provided on the inner surface of the one of the arms, said fifth and tenth electrodes are connected to a common port from which a detection signal is detected; and wherein, when said fifth electrode is provided on the outer surface of the one of the arms, a detection signal is detected from a differential signal between said fifth and tenth electrodes.

27. An angular rate sensor comprising:

a tuning fork oscillator having at least two arms and a base, including:

a first oscillator member of a single crystalline piezoelectric material having at least two arms and a base joining the two arms; and a second oscillator member of the single crystalline piezoelectric material having a shape substantially identical to a shape of said first oscillator member, said first and second oscillator members being bonded directly to each other in a direction of a thickness and in a direction of a crystallographic axis so that opposite polarities of a piezoelectric effect may be developed along a widthwise direction of said first and second oscillator members;

first and second electrodes provided on first and second main surfaces of one of the arms of said tuning fork oscillator, respectively;

third and fourth electrodes provided on one of outer and inner surfaces of the one of the arms, said third and fourth electrodes being provided on a portion close to said first electrode and a portion close to said second electrode, respectively;

a fifth electrode provided on one of the inner and outer surfaces of the one of the arms, said fifth electrode being disposed on a surface opposite to the surface on which said third and fourth electrodes are provided;

sixth and seventh electrodes provided on first and second main surfaces of the other arm of the arms of said tuning fork oscillator, respectively, said sixth and seventh electrodes being provided on portions close to an inner surface of the other arm, respectively; and eighth and ninth electrodes provided on the inner surface of the other arm, said eighth and ninth electrodes being provided on a portion close to said sixth electrode and a portion close to said seventh electrode, respectively;

wherein a driving voltage is applied to said first, fourth, seventh, and eighth electrodes at a polarity identical to one another and applied to said second, third, sixth, and ninth electrodes at a polarity opposite to said first, fourth, seventh, and eighth electrodes.

28. The angular rate sensor according to claim 27, further comprising:

a tenth electrode provided on an outer surface of said other arm of said tuning fork oscillator; and two monitor electrodes provided on remaining portions of the first and second main surfaces of the other arm;

wherein, when said fifth electrode is provided on the inner surface of the one of the arms, a detection signal is detected from a differential signal between said fifth and tenth electrodes; and wherein, when said fifth electrode is provided on the outer surface of the one of the arms, said fifth and tenth electrodes are connected to a common port from which a detection signal is detected.

29. An angular rate sensor comprising:

a tuning fork oscillator having at least two arms and a base, including:
  a first oscillator member of a single crystalline piezoelectric material having at least two arms and a base joining the two arms; and
  a second oscillator member of the single crystalline piezoelectric material having a shape substantially identical to a shape of said first oscillator member, said first and second oscillator members being bonded directly to each other in a direction of a thickness and in a direction of a crystallographic axis so that opposite polarities of a piezoelectric effect may be developed along a widthwise direction of said first and second oscillator members;

first and second electrodes provided on first and second main surfaces of one of the arms of said tuning fork oscillator, respectively;

third and fourth electrodes provided on an outer surface of the one of the arms, said third and fourth electrodes being provided on a portion close to said first electrode and a portion close to said second electrode, respectively;

fifth and sixth electrodes provided on an inner surface of the one of the arms, said fifth and sixth electrodes being provided on a portion close to said first electrode and a portion close to said second electrode, respectively;

a seventh electrode provided on one of first and second main surfaces of other arm of the arms of said tuning fork oscillator;

eighth and ninth electrodes provided on an outer surface of the other arm, said eighth and ninth electrodes being provided on a portion close to the first main surface of the other arm and a portion close to the second main surface of the other arm, respectively; and tenth and eleventh electrodes provided on an inner surface of the other arm, said tenth and eleventh electrodes being provided on a portion close to the first main surface of the other arm and a portion close to the second main surface of the other arm, respectively;

wherein, when said seventh electrode is provided on the first main surface, a driving voltage is applied to said first, eighth, and tenth electrodes at a polarity identical to one another and applied to said second, third, fifth, and seventh electrodes at a polarity opposite to said first, eighth, and tenth electrodes; and wherein, when said seventh electrode is provided on the second main surface, a driving voltage is applied to said first and seventh electrodes at a polarity identical to each other and applied to said second, third, fifth, ninth, and eleventh electrodes at a polarity opposite to said first and seventh electrodes.

30. The angular rate sensor according to claim 29, wherein:

when said seventh electrode is provided on the first main surface, said fourth and ninth electrodes are connected to a common port, said sixth and eleventh electrodes are connected to another common port, and a detection signal is detected from a differential signal between the common ports; and when said seventh electrode is provided on the second main surface, said fourth and eighth electrodes are connected to a common port, said sixth and tenth electrodes are connected to another common port, and a detection signal is detected from a differential signal between the common ports.

31. The angular rate sensor according to claim 1, wherein the electrodes provided on the first and second main surfaces of the arms are extended onto a surface of the base.

32. The angular rate sensor according to claim 1, wherein the electrodes provided on the outer surfaces of the arms are extended onto a surface of the base.

33. The angular rate sensor according to claim 16, further comprising four monitor electrodes provided on remaining portions of the first and second main surfaces of the arms of said tuning fork oscillator, respectively.

34. The angular rate sensor according to claim 17, further comprising four monitor electrodes provided on remaining portions of the first and second main surfaces of the arms of said tuning fork oscillator, respectively.

35. The angular rate sensor according to claim 18, further comprising four monitor electrodes provided on remaining portions of the first and second main surfaces of the arms of said tuning fork oscillator, respectively.

36. The angular rate sensor according to claim 19, further comprising four monitor electrodes provided on remaining portions of the first and second main surfaces of the arms of said tuning fork oscillator, respectively.

37. The angular rate sensor according to claim 20, further comprising four monitor electrodes provided on remaining portions of the first and second main surfaces of the arms of said tuning fork oscillator, respectively.

38. The angular rate sensor according to claim 21, further comprising four monitor electrodes provided on remaining portions of the first and second main surfaces of the arms of said tuning fork oscillator, respectively.

39. The angular rate sensor according to claim 22, further comprising four monitor electrodes provided on remaining portions of the first and second main surfaces of the arms of said tuning fork oscillator, respectively.

40. The angular rate sensor according to claim 18, further comprising:
- two grounding electrodes provided on remaining portions of the first and second main surfaces of the one of the arms of said tuning fork oscillator, respectively; and
- two monitor electrodes provided on remaining portions of the first and second main surfaces of the other arm.

41. The angular rate sensor according to claim 20, further comprising:
- two grounding electrodes provided on remaining portions of the first and second main surfaces of the one of the arms of said tuning fork oscillator, respectively; and
- two monitor electrodes provided on remaining portions of the first and second main surfaces of the other arm.

42. The angular rate sensor according to claim 22, further comprising:
- two grounding electrodes provided on remaining portions of the first and second main surfaces of the one of the arms of said tuning fork oscillator, respectively; and
- two monitor electrodes provided on remaining portions of the first and second main surfaces of the other arm.

43. The angular rate sensor according to claim 3, wherein the electrodes provided on the first and second main surfaces of the arms are extended onto a surface of the base.

44. The angular rate sensor according to claim 5, wherein the electrodes provided on the first and second main surfaces of the arms are extended onto a surface of the base.

45. The angular rate sensor according to claim 7, wherein the electrodes provided on the first and second main surfaces of the arms are extended onto a surface of the base.

46. The angular rate sensor according to claim 11, wherein the electrodes provided on the first and second main surfaces of the arms are extended onto a surface of the base.

47. The angular rate sensor according to claim 15, wherein the electrodes provided on the first and second main surfaces of the arms are extended onto a surface of the base.

48. The angular rate sensor according to claim 17, wherein the electrodes provided on the first and second main surfaces of the arms are extended onto a surface of the base.

49. The angular rate sensor according to claim 19, wherein the electrodes provided on the first and second main surfaces of the arms are extended onto a surface of the base.

50. The angular rate sensor according to claim 21, wherein the electrodes provided on the first and second main surfaces of the arms are extended onto a surface of the base.

51. The angular rate sensor according to claim 25, wherein the electrodes provided on the first and second main surfaces of the arms are extended onto a surface of the base.

52. The angular rate sensor according to claim 27, wherein the electrodes provided on the first and second main surfaces of the arms are extended onto a surface of the base.

53. The angular rate sensor according to claim 29, wherein the electrodes provided on the first and second main surfaces of the arms are extended onto a surface of the base.

54. The angular rate sensor according to claim 3, wherein the electrodes provided on the outer surfaces of the arms are extended onto a surface of the base.

55. The angular rate sensor according to claim 4, wherein the electrodes provided on the outer surfaces of the arms are extended onto a surface of the base.

56. The angular rate sensor according to claim 5, wherein the electrodes provided on the outer surfaces of the arms are extended onto a surface of the base.

57. The angular rate sensor according to claim 6, wherein the electrodes provided on the outer surfaces of the arms are extended onto a surface of the base.

58. The angular rate sensor according to claim 7, wherein the electrodes provided on the outer surfaces of the arms are extended onto a surface of the base.

59. The angular rate sensor according to claim 8, wherein the electrodes provided on the outer surfaces of the arms are extended onto a surface of the base.

60. The angular rate sensor according to claim 9, wherein the electrodes provided on the outer surfaces of the arms are extended onto a surface of the base.

61. The angular rate sensor according to claim 11, wherein the electrodes provided on the outer surfaces of the arms are extended onto a surface of the base.

62. The angular rate sensor according to claim 12, wherein the electrodes provided on the outer surfaces of the arms are extended onto a surface of the base.

63. The angular rate sensor according to claim 13, wherein the electrodes provided on the outer surfaces of the arms are extended onto a surface of the base.

64. The angular rate sensor according to claim 15, wherein the electrodes provided on the outer surfaces of the arms are extended onto a surface of the base.

65. The angular rate sensor according to claim 17, wherein the electrodes provided on the outer surfaces of the arms are extended onto a surface of the base.

66. The angular rate sensor according to claim 19, wherein the electrodes provided on the outer surfaces of the arms are extended onto a surface of the base.

67. The angular rate sensor according to claim 21, wherein the electrodes provided on the outer surfaces of the arms are extended onto a surface of the base.

68. The angular rate sensor according to claim 25, wherein the electrodes provided on the outer surfaces of the arms are extended onto a surface of the base.

69. The angular rate sensor according to claim 27, wherein the electrodes provided on the outer surfaces of the arms are extended onto a surface of the base.

70. The angular rate sensor according to claim 29, wherein the electrodes provided on the outer surfaces of the arms are extended onto a surface of the base.

* * * * *